(12) United States Patent    (10) Patent No.: US 8,381,249 B2
Rasanen et al.    (45) Date of Patent: Feb. 19, 2013

(54) SYSTEMS AND METHODS FOR ACQUIRING, CATEGORIZING AND DELIVERING MEDIA IN INTERACTIVE MEDIA GUIDANCE APPLICATIONS

(75) Inventors: Kirsten Rasanen, New York, NY (US); Jay S. Bryant, West Windsor, NJ (US)

(73) Assignee: United Video Properties, Inc., Santa Clara, CA (US)

( * ) Notice: Subject to any disclaimer, the term of this patent is extended or adjusted under 35 U.S.C. 154(b) by 421 days.

(21) Appl. No.: 11/641,976

(22) Filed: Dec. 18, 2006

(65) Prior Publication Data

US 2008/0086747 A1    Apr. 10, 2008

Related U.S. Application Data

(60) Provisional application No. 60/849,988, filed on Oct. 6, 2006.

(51) Int. Cl.
*H04N 5/445* (2011.01)
(52) U.S. Cl. .............. 725/47; 725/44; 725/45; 725/46
(58) Field of Classification Search .............. 725/44–45, 725/47–48, 53
See application file for complete search history.

(56) References Cited

U.S. PATENT DOCUMENTS

| | | |
|---|---|---|
| 4,488,179 A | 12/1984 | Kruger et al. |
| 4,706,121 A | 11/1987 | Young |
| 4,751,578 A | 6/1988 | Reiter et al. |
| 4,908,713 A | 3/1990 | Levine |
| 5,335,277 A | 8/1994 | Harvey et al. |
| 5,353,121 A | 10/1994 | Young et al. |
| 5,357,276 A | 10/1994 | Banker et al. |
| 5,523,796 A | 6/1996 | Marshall |
| 5,592,551 A | 1/1997 | Lett et al. |
| 5,596,373 A | 1/1997 | White |
| 5,635,989 A | 6/1997 | Rothmuller |
| 5,671,411 A | 9/1997 | Watts et al. |
| 5,684,525 A | 11/1997 | Klosterman |
| 5,758,259 A | 5/1998 | Lawler |
| 5,798,785 A | 8/1998 | Hendricks et al. |
| 5,801,787 A * | 9/1998 | Schein et al. ............... 725/43 |
| 5,812,124 A * | 9/1998 | Eick et al. .................. 725/45 |
| 5,838,319 A * | 11/1998 | Guzak et al. ............... 715/854 |
| 5,883,677 A | 3/1999 | Hofmann |
| 5,959,688 A | 9/1999 | Schein et al. |
| 6,005,565 A * | 12/1999 | Legall et al. ............... 715/721 |

(Continued)

FOREIGN PATENT DOCUMENTS

| | | |
|---|---|---|
| BR | PI 9709794-2 | 12/1997 |
| CA | 2 256 691 | 11/2003 |

(Continued)

OTHER PUBLICATIONS

"iTunes v4-1.pdf", Oct. 2003, version 4.1.*

(Continued)

*Primary Examiner* — Nicholas Corbo
(74) *Attorney, Agent, or Firm* — Ropes & Gray LLP

(57) ABSTRACT

Systems and methods are discussed for providing guidance for Internet-delivered media. In some embodiments, information on available media on the Internet is gathered. The information is associated with existing media guidance data. The associations enable a media guidance application to identify relevant online media and to display listings in a user-friendly way. A user interface for an online media guidance application is also provided. The user interface allows a user to narrow down the large amount of Internet-delivered media in a systematic way according to criteria that interests a user.

36 Claims, 18 Drawing Sheets

U.S. PATENT DOCUMENTS

| | | | |
|---|---|---|---|
| 6,008,803 A * | 12/1999 | Rowe et al. | 715/721 |
| 6,247,176 B1 | 6/2001 | Schein et al. | |
| 6,341,374 B2 | 1/2002 | Schein et al. | |
| 6,373,528 B1 | 4/2002 | Bennington et al. | |
| 6,701,527 B2 | 3/2004 | Schein et al. | |
| 6,898,762 B2 | 5/2005 | Ellis et al. | |
| 7,047,549 B2 | 5/2006 | Schein et al. | |
| 7,124,424 B2 | 10/2006 | Gordon et al. | |
| 7,162,729 B2 | 1/2007 | Schein et al. | |
| 7,260,564 B1 | 8/2007 | Lynn et al. | |
| 7,543,320 B2 | 6/2009 | Schein et al. | |
| 8,051,450 B2 | 11/2011 | Robarts et al. | |
| 2002/0103920 A1 | 8/2002 | Berkun et al. | |
| 2002/0184629 A1 | 12/2002 | Sie et al. | |
| 2002/0188944 A1* | 12/2002 | Noble | 725/39 |
| 2003/0028889 A1* | 2/2003 | McCoskey et al. | 725/91 |
| 2003/0061610 A1* | 3/2003 | Errico | 725/46 |
| 2003/0226147 A1 | 12/2003 | Richmond et al. | |
| 2005/0160458 A1* | 7/2005 | Baumgartner | 725/46 |
| 2005/0193414 A1* | 9/2005 | Horvitz et al. | 725/46 |
| 2005/0198006 A1 | 9/2005 | Boicey et al. | |
| 2005/0278741 A1* | 12/2005 | Robarts et al. | 725/46 |
| 2006/0085826 A1 | 4/2006 | Funk et al. | |
| 2006/0271953 A1 | 11/2006 | Jacoby et al. | |
| 2007/0204285 A1 | 8/2007 | Louw | |
| 2008/0077957 A1 | 3/2008 | Schein et al. | |

FOREIGN PATENT DOCUMENTS

| | | |
|---|---|---|
| CN | ZL97195529.8 | 6/2006 |
| EP | 0 721 253 | 10/1996 |
| EP | 0908049 | 8/2007 |
| HK | 1022069 | 4/2007 |
| JP | 2002-335473 | 11/2002 |
| JP | 2003-067226 | 3/2003 |
| JP | 4410169 | 11/2009 |
| JP | 2010-506299 | 2/2010 |
| JP | 2010-187389 | 8/2010 |
| JP | 2011-83034 | 4/2011 |
| KR | 0552408 | 2/2006 |
| WO | WO 92/04801 | 3/1992 |
| WO | WO 96/09721 | 3/1996 |
| WO | WO 96/17473 | 6/1996 |
| WO | WO 97/30546 | 8/1997 |
| WO | WO 97/48228 | 12/1997 |
| WO | WO 00/33560 | 6/2000 |

OTHER PUBLICATIONS

Sheth A. et al., "Videoanywhere: A system for searching and managing distributed heterogeneous video assets", Sigmod Record, 28(1):104-109 (Mar. 31, 1999).

YouTube Website, "YouTube Homepage, Categories browsing", pp. 1-4, (Aug. 26, 2006) <http://web.archive.org/web/20060826163534/youtube.com/index>.

International Search Report dated Jul. 23, 2008 for International Application No. PCT/US2007/021368.

Goldberg, "A 35-inch Zenith TV premieres StarSight's onscreen guide," Video (Apr. 1995) p. 41.

StarSight User's Manual.

Hofmann, J., "The Consumer Electronic Bus: An Integrated Multi-Media LAN for the Home," International Journal of Digital and Analog Communication Systems, vol. 4, No. 2, 1991, pp. 77-86.

"IS-60.3 Physical Layer and Medium Specifications. Part 3—CS Physical Layer & Medium Specification," CX Specification, Revised Mar. 19, 1992, Table of Contents (2 pp.) and pp. 1-41.

O'Brien, Jr., T.E., "Physical and Media Specifications of the CXBus," IEEE Transactions on Consumer Electronics, vol. 37, No. 3, Aug. 1991, pp. 357-366.

Davidson, Ken, "CEBus: A New Standard in Home Automation" Circuit Cellar Ink, pp. 40-52 (1989).

Declaration of Rosetta Rogers Under 37 CFR 1.131 in U.S. Appl. No. 09/393,955.

"Electronic Program Guide Via Internet", Research Disclosure Bulletin, No. 385:276, May 1996, p. 276.

* cited by examiner

SYSTEMS AND METHODS FOR ACQUIRING, CATEGORIZING AND DELIVERING MEDIA IN INTERACTIVE MEDIA GUIDANCE APPLICATIONS

This application claims the benefit of U.S. Provisional Application No. 60/849,988, filed Oct. 6, 2006, the disclosure of which is hereby incorporated by reference herein in its entirety.

BACKGROUND OF THE INVENTION

This invention relates generally to media guidance applications, and in particular, to providing guidance for media obtained from the Internet.

The Internet is an increasingly popular resource for obtaining entertainment media and information. There are an incredible number of sources on the Internet that provide various types of media, such as downloadable television episodes and movies, or streaming television previews and movie trailers. Furthermore, nearly all of the media and related information on the Internet is available on demand. Therefore, users may be confident that media of interest is always available.

The abundance of online media and media providers, however, also creates difficulty in terms of locating media of interest. To locate particular online media content without guidance, a user may need to know a significant amount of information about the media. For example, if a user wants to find media related to a particular episode of a television show, the user may need to go directly to the media provider, which in this case is the website of the television network. Then, the user may need to know the original air date of the episode or the title of the episode in order to effectively locate media on the network website. Not only is this process inconvenient for the user, it provides no help for those who are not searching for a particular media. Thus, guidance for Internet-delivered media content is necessary to enable or aid a user to easily and effectively locate media of interest.

Some forms of guidance for media content provided on the Internet are already available. Many guidance applications for online media are limited to keyword searching and providing listings of featured media. Neither of these techniques provide effective or systematic means for narrowing down the extremely large amount of media that is available on the Internet. Thus, users of existing guidance applications are often bombarded with an overabundance of listings, many of which may be uninteresting or irrelevant. Therefore, there is a need for a guidance application that not only provides keyword searching and displays featured online media, but also provides a systematic method for narrowing down the available online media to a reasonably small set of media that interests the user.

The media listings generated by existing guidance applications are often not conducive for browsing. Video searches may yield results that are cluttered, unorganized, difficult to navigate, or unfocused. Different types of videos may be presented in similar formats, making them virtually indistinguishable. For example, professionally-generated media content may be displayed in a similar format as user-generated media content, and high-quality media content may displayed in a similar format as lower-quality media content. Therefore, users may need to spend a significant amount of time going through each media listing. Thus, there is a need for an online media guidance application that enables users to quickly browse through a set of online media listings.

Furthermore, many existing guidance applications only provide guidance for a limited set of videos on the Internet. The limited set may, therefore, not include available online media that a user is interested in. Some guidance applications are limited, because they only provide guidance for media content that they host. Other applications that obtain media from third-party sites rely on partnerships with media providers, which again results in a very limited media data set. Therefore, there is need for a guidance application that provides guidance for a comprehensive set of online media content.

SUMMARY OF THE INVENTION

Accordingly, systems and methods are provided for identifying and obtaining information for a set of media provided on the Internet, and displaying a subset of the identified media in a listing. Systems and methods are also provided that systematically narrow down a set of online media listings provided to a user based on criteria that interests the user.

In accordance with one principle of the invention, an online media guidance application provides selectable criteria elements (e.g., action/adventure, comedy, ABC, Comedy Central, etc.) in a user interface. By receiving one or more selections of the selectable criteria elements, a set of available online videos may be systematically narrowed down to a reasonably-sized set of videos that interest the user. The selectable criteria elements may be organized into categories (e.g., genre, channels, shows). The categories may also be displayed in the user interface, and the corresponding selectable criteria elements may be presented in a window near or below the corresponding category. To keep the user interface from being cluttered, the criteria elements of one category may be visible at a given time. When a user selects a different category, the currently presented window of criteria elements may be closed, and a new window of selectable criteria elements corresponding to the selected category is presented.

When a user selection of a criteria element is received by the media guidance application, a set of videos is identified based on the selected criteria element and any previously selected criteria elements. In some embodiments, the set of identified media may include available media that meet all of the selected criteria elements. In other embodiments, the set of identified media may include available media that meet one or more of the selected criteria elements. The set of media may be displayed in a listing, such as in a video mosaic or a textual listing. In some embodiments, each listing is displayed within a selectable frame, and upon receiving user selection of a frame, the guidance application directs the user to the website of the corresponding media provider.

In some embodiments of the present invention, after narrowing down the number of listings, the displayed criteria elements may also change to reflect the new set of identified videos. For instance, when a new window of selectable criteria elements is presented, criteria elements may be displayed in the window only if selecting the criteria element would produce at least one video in the redefined set. In some cases, a criteria element may be displayed in the window if there are videos in the identified set of videos that meet the criteria element and all previously selected criteria elements.

In accordance with another principle of the present invention, the set of online media that the guidance application provides guidance for is determined by crawling through a plurality of websites and obtaining information on media provided by each website. The obtained information may include metadata (e.g., title, runtime, description, etc.) corresponding to each video.

For each video obtained from the Internet, the media guidance application associates video metadata with media guidance application data from, for example, a media guidance application database. Associations may be determined by comparing the video metadata with guidance data in the guidance application database. A subset of the available online videos may be selected based on the scope narrowing mechanism described above, keyword searches, user personalization data, or editor's preference designations. The selected online videos may be displayed in a media listing, such as in a video mosaic or a textual listing. Included in the listing for each video is the associated guidance application data from the guidance application database.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application. Similarly, a media guidance application that provides guidance for Internet content, and possibly other types of content, is referred to herein as an online media guidance application or online guidance application.

Various forms of interactive media guidance applications may provide guidance for media content on the Internet (e.g., streaming media, downloadable media, Webcasts, etc.). One typical type of media guidance application that provides guidance for online media is an interactive television program guide. Interactive television program guides (sometimes referred to as electronic program guides) are well-known guidance applications that, among other things, allow users to navigate among and locate many types of media content. Other than online media, such content may include conventional television programming (provided via traditional broadcast, cable, satellite, or other means), as well as pay-per-view programs, on-demand programs (as in video-on-demand (VOD) systems), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 1:
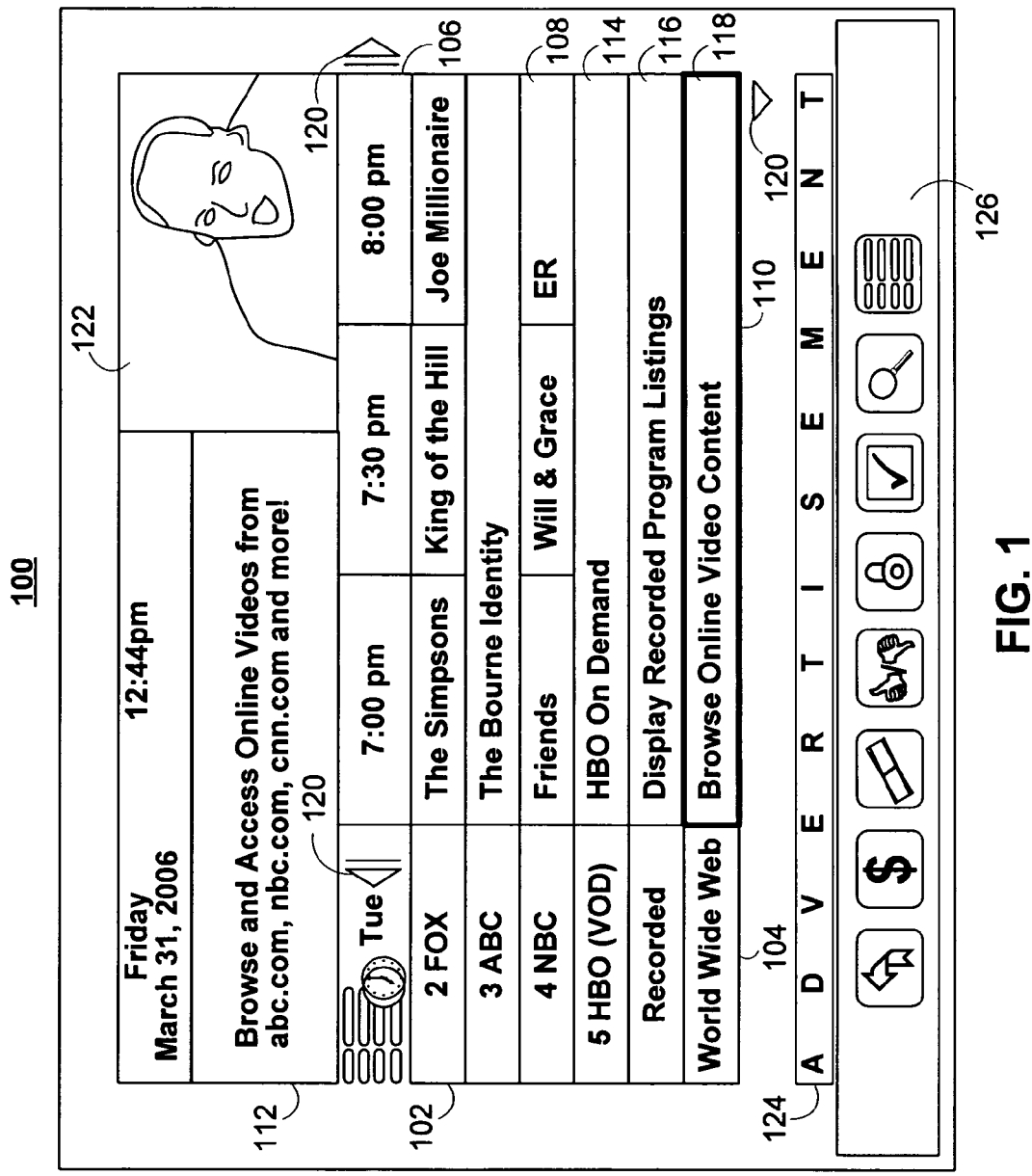
FIG. 1 shows an illustrative display screen using a grid format that may be used to provide guidance for online video and other types of media.
Figure 2:
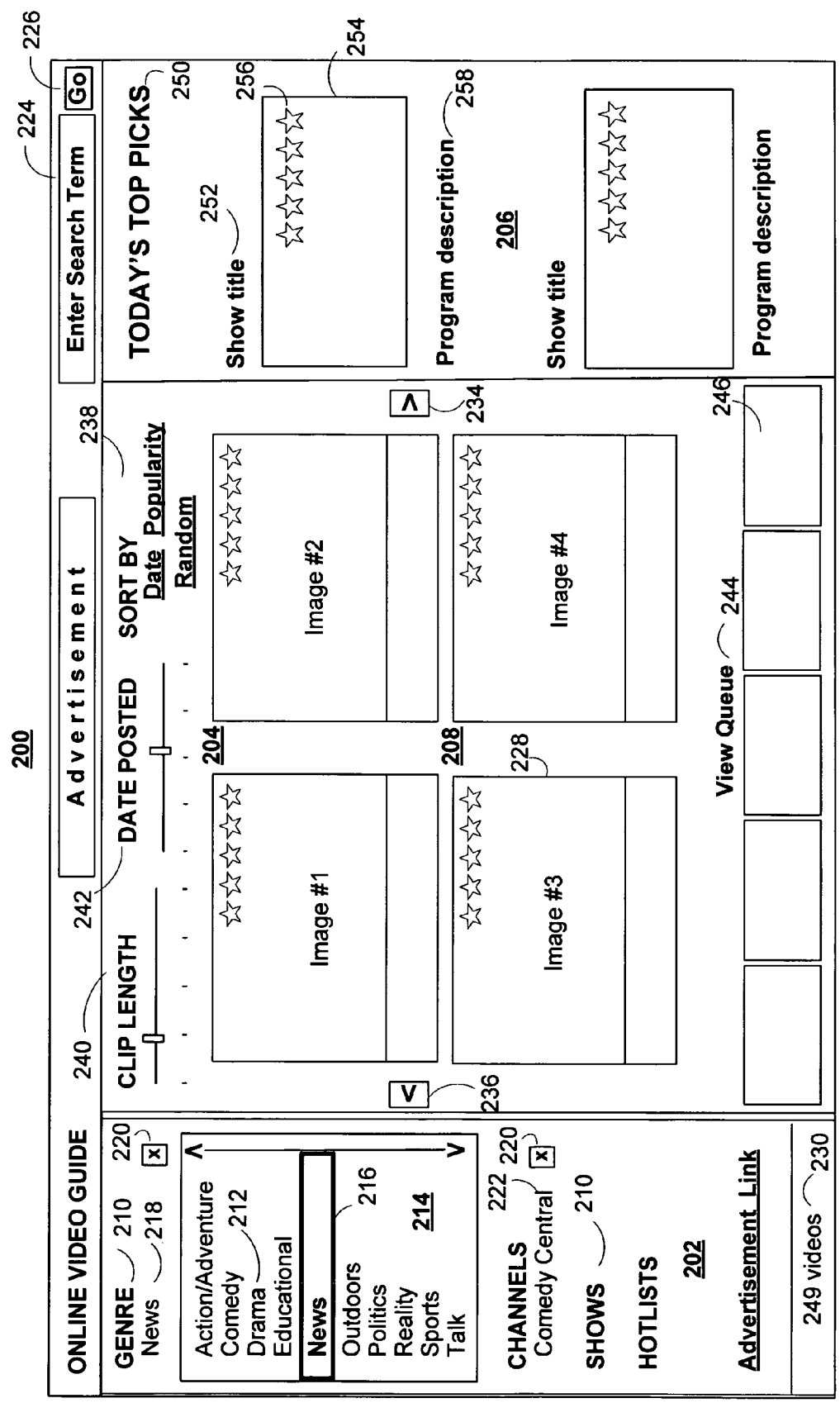
FIG. 2 shows an illustrative display screen using a mosaic that may be used to provide guidance for online video.

One of the functions of the media guidance application is to provide media listings and media information to users. FIGS. 1-2 show illustrative display screens that may be used to provide media guidance, and in particular media listings. The display screens shown in FIGS. 1-2 may be implemented on any suitable device or platform. While the displays of FIGS. 1-2 and are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content (e.g., online video) in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including Internet content (e.g., streaming media, downloadable media, etc.) from various online sources, on-demand media content (e.g., VOD), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. As shown in FIG. 1, information region 112 may display information on the type of display that may be provided when accessing such a listing. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content (e.g. Internet content), media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

Another display arrangement for providing guidance is shown in FIG. 2. Display 200 provides guidance for Internet-delivered videos, and may be provided as a display in an online media guidance application, or as a display in a client-server or stand-alone (e.g., set-top box based) guidance application. In some examples herein, Internet-delivered television programs are provided, although the disclosed embodiments may provide guidance for movies, user-generated content, or any other types of media content. In some embodiments, display 200 is displayed a result of user selection of listing 118 in display 100 (FIG. 1). For clarity and organization, display 200 may be split into three columns. Center column 204 contains media listings arranged in mosaic 208. Left column 202 allows a user to define criteria (e.g. a particular genre, show, etc.) for the videos provided in mosaic 208. Right column 206 provides recommendations to the user. Each of these columns will be discussed in more detail below in connection with FIGS. 2-7, 8A-8C, and 9A-9B.

Left column 202 allows a user to select videos based on criteria of interest. Left column 202 provides a list of selectable categories 210. The categories may include genre, channels, shows, hotlists, type (e.g., television episode, movies, etc.), or any other such category. One of the categories may be in a selected state. The category may be selected based on user indication or may default to being selected. In the selected state, there may be a window 214 of selectable criteria elements 212 corresponding to the selected category. The window may be situated under the name of the category to indicate which category is selected. With a user input device, a user may select a criteria element 212 in window 214 (e.g., by moving highlighted region 216 to a desired criteria element and pressing a key or by directly clicking the desired criteria element). Once selected, in addition to being displayed within window 214, the selected criteria element may appear at 218. That is, it may appear below its corresponding category 210 and above window 214. This indicates to the user that the criteria element has been successfully selected. When multiple criteria elements are selected within the same category, each criteria element may be listed below the category in some order (e.g., in the order the criteria elements were selected, in alphabetical order, etc.). A selected criteria element may be listed below its corresponding category even when the category is not selected, as indicated by selected criteria element 222. Selectable buttons 220 may be provided next to each selected criteria element 218 and 222. Selecting button 220 may deselect the corresponding selected criteria element.

An alternative way for a user to select criteria elements is to manually enter search terms/keywords. A user may enter one or more keywords into search bar 224 using a user input device. Selectable button 226 may be selected to initiate a search using the entered keywords. Search bar 224 may be used in conjunction with left column 202, if desired (e.g., a user may define criteria elements based on selected criteria elements in column 202 and keywords entered into search bar 224).

Center column 204 may display a set of videos in mosaic 208, where the set of videos is determined based on receiving user input of search bar 224 and/or left column 202. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. To avoid over-complicating the figure, a more detailed view of a listing 228 in mosaic 208 is shown in FIG. 3.

Figure 3:
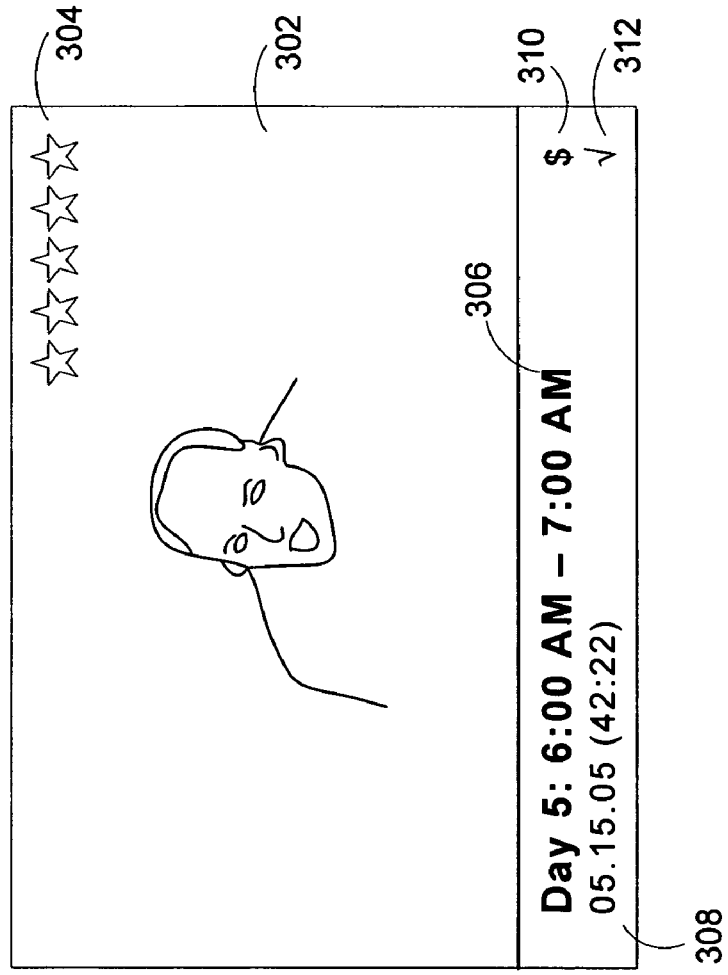
FIG. 3 shows a more detailed view of a listing in the mosaic of FIG. 2.

FIG. 3 illustrates one embodiment of media listing 228 in mosaic 208 (FIG. 2). A video may be represented by graphical identifier 302 (e.g., a thumbnail/screenshot of the video, a preview of the video, the video itself, etc.). A rating 304 for the video may be overlaid on part of graphical identifier 302. The rating may reflect rating designations from all users who have rated the video from their respective media guidance applications or a related/affiliate program. The visual indicator may also be accompanied by text box/overlay 306 to provide further information about the media content. For example, textual description 308 may include the media title, the date the video became available, and the length of the video. Also, text box may include simple icons 310 and/or 312. Icon 310, a simple dollar sign, may be present if the media costs some amount of money to download or stream from the media provider. If icon 310 is not present, then the video is free. Similarly, an icon such as check mark 312 may be present if the video is a video recommended by an editor (e.g., television or movie critic). Otherwise, checkmark 310 may not be present.

Returning to FIG. 2, the number of total identified videos after applying selected or entered criteria is shown in region 230. Region 230 is shown to be in left column 202 but may be displayed anywhere on user interface 200. If more videos are identified than those currently visible in mosaic 208, selectable arrows 234 and 236 may be used to view more available videos. Selectable arrow 234 allows a user to view a new subset of identified videos, and selectable arrow 236 returns the user to the previously viewed subset of identified videos. The user may change the order in which the videos are presented by selecting one of sort links 238. The identified videos may be sorted according to the date that the video became available (e.g. most recent first or oldest first), the popularity of the video (e.g. based on the total number of times the video has been selected by other users), in a random order, or using any other mechanism for sorting a set of videos.

User interface 200 also allows users to indicate a desired maximum video length and desired newness using sliders 240 and 242. Slider 240 sets a maximum video length. When slider 240 is to the far right, there is no restriction on video length. As the slider is moved to the left, only shorter and shorter videos may be included in the results. For example, if slider 240 is at the midpoint of the scale, only video clips that are less than thirty minutes are included in the results. If the slider is at the far left, only video clips that are less than five minutes are included in the results. Similarly, slider 242 sets a maximum date range. When slider 242 is to the far right, there is no restriction how old the video may be. As the slider is moved to the left, only more and more recent videos may be included in the resulting display.

Mosaic 208 is a two by two grid of listings 228. However, any other arrangement may be used, such as a three by three or two by three grid. Furthermore, although each listing 228 is shown to be the same size, they may also be different sizes. Listings may be of different sizes or graphically accentuated to indicate degrees of interest to the user, the relevance of each identified video following a search, or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Each listing 228 may be a selectable frame. In one embodiment of the invention, upon a user selection of a selectable frame, the user is directed to the website where the corresponding video may be downloaded or streamed. The website may be displayed in an overlay or in a new screen. In another embodiment of the invention, upon user selection of listing 228, additional information about the video, such as the description of the program, may be presented to the user in an overlay or in right column 206. Based on the additional information, the user may choose to be directed to the website where the video is provided, may add the video to a My Favorite Videos list, or may add the video to view queue 244.

View queue 244 displays a list of videos that a user has chosen to view at a later time. Each video may be represented by a graphical identifier, such as a screenshot/thumbnail, a preview of the video, or the video itself. In one embodiment of the invention, each video identifier 246 is selectable, which provides the user with easy access to the videos that the user intends to watch. When a video from the view queue is selected, the user may be directed to the website where the video is provided. The video may be removed from the view queue automatically when the video is selected, or the user may manually remove the video from the view queue. In another embodiment of the invention, view queue 244 acts as a "playlist." When the user is ready to watch a video from the view queue, the user is directed to the website of the first video in the view queue.

Figure 4:
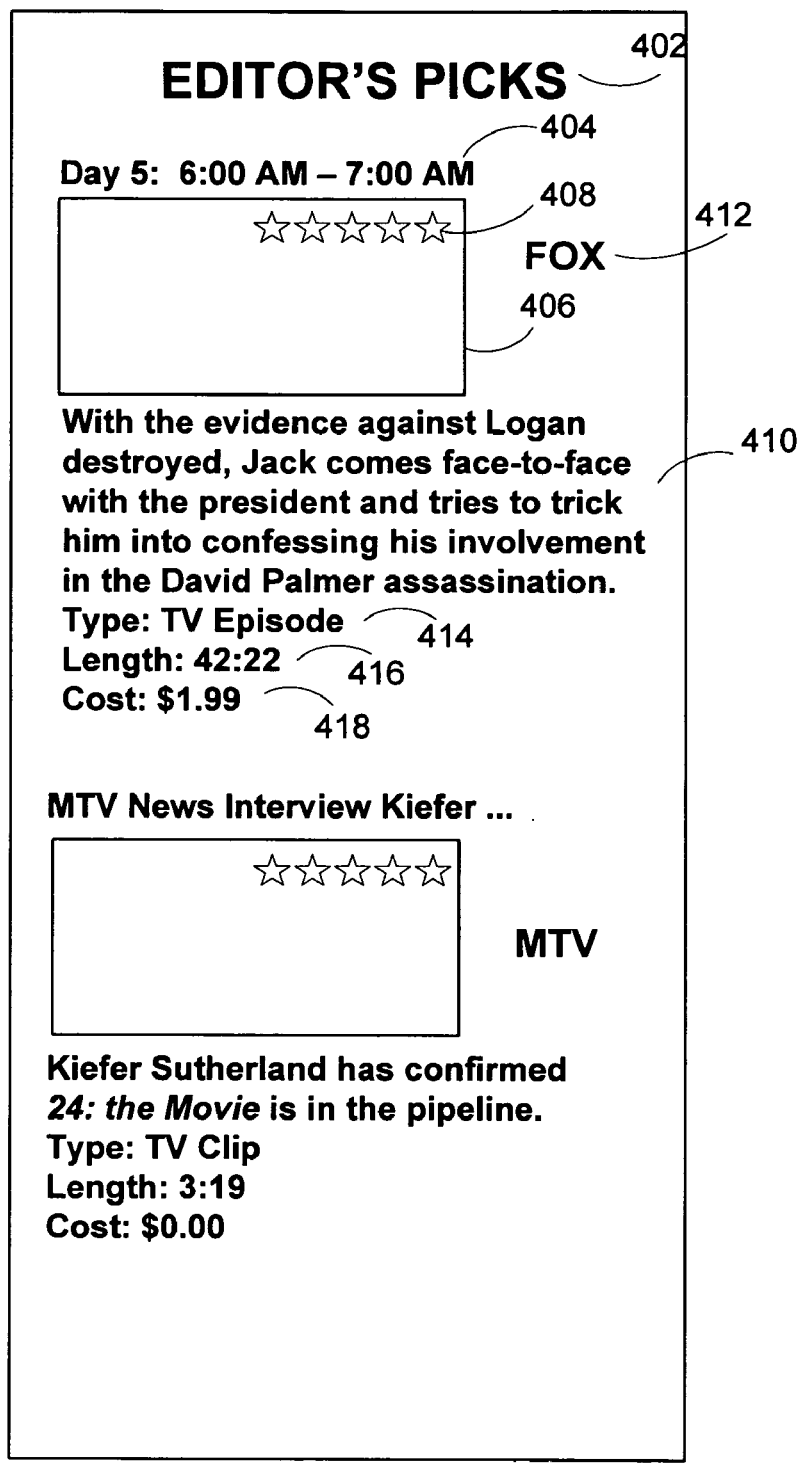
FIGS. 4-5 are two illustrative embodiments of a portion of the display screen of FIG. 2.

Right column 206 may display two types of information. It may (1) present recommended videos to the user, or (2) display additional information about a selected video. FIGS. 2 and 4 show rightmost column 206 performing the former function of displaying recommendations to the user. The latter function will be described in detail below in connection with FIG. 5. Heading 250 of column 206 reads "TODAY'S TOP PICKS," indicating that the recommendations are chosen based on the most popular videos for the day. Other ways to provide recommendations to the user will be discussed in detail below in connection with FIG. 4. The recommended videos may be presented to the user by providing a format similar to listing 228, discussed above and in connection with FIG. 3. Alternatively, a recommended video may be displayed by listing the title of the video 252, a graphical identifier for the video 254 with a ratings overlay 256, and a brief program description 258 of the video. Other information may be provided for each video in column 202.

When a user initially enters the guidance application, the top picks may be based on the most popular videos of all available videos in any category. As the user defines video types of interest by searching for keywords or selecting criteria elements in left column 202, the recommended videos in right column 206 may change to reflect the user's actions. For example, if the user chooses the "Action/Adventure" criteria element in window 214, the videos under "TODAY'S TOP PICKS" may be changed to include the top one or more of the most popular action/adventure videos of the day.

Recommendations provided in right column 206 may be based on criteria other than popularity. For example, recommendations may be based on an editor's recommendation, as shown in column 400 of FIG. 4. Heading 402 reads "EDITOR'S PICKS" to reflect the way in which the recommended videos are chosen. The editor may be a famous movie or television critic or any other personality that a user may identify with. Consistent with one embodiment of the present invention, column 400 may provide more information about each recommended video than the listings in mosaic 208 (FIG. 2). For example, for each recommended video, title 404, graphical identifier (e.g., thumbnail/screenshot, etc.) 406 with ratings 408 overlay, and brief description 410 are displayed. Rating 406 for each video may be based on user-entered ratings. Other information about the video may include network symbol 412 (e.g. FOX) from the network that the video was originally broadcast, the genre (e.g. action/adventure, drama, etc.) or type 414 (e.g. television episode, movie, etc.), length of the video 416, and cost 418 to download or stream the video. FOX is a registered trademark owned by FOX Broadcast Company. Column 400 is merely illustrative, and therefore, more or less information about a video than the above-mentioned may be displayed.

Techniques may be used for choosing recommendations for a user other than based on popularity or an editor's picks. The recommendations may be based on the user's interest. The user's interest may be obtained by monitoring user behavior on the media guidance application, by express user designations, or from a user profile. For example, if the user does not like action/adventure videos, the recommended videos may be the most popular two or three videos excluding action/adventure videos. If the user typically watches videos highlighted by Roger Ebert, the recommended videos may be two or three videos that were most recently highlighted by Roger Ebert.

Figure 5:
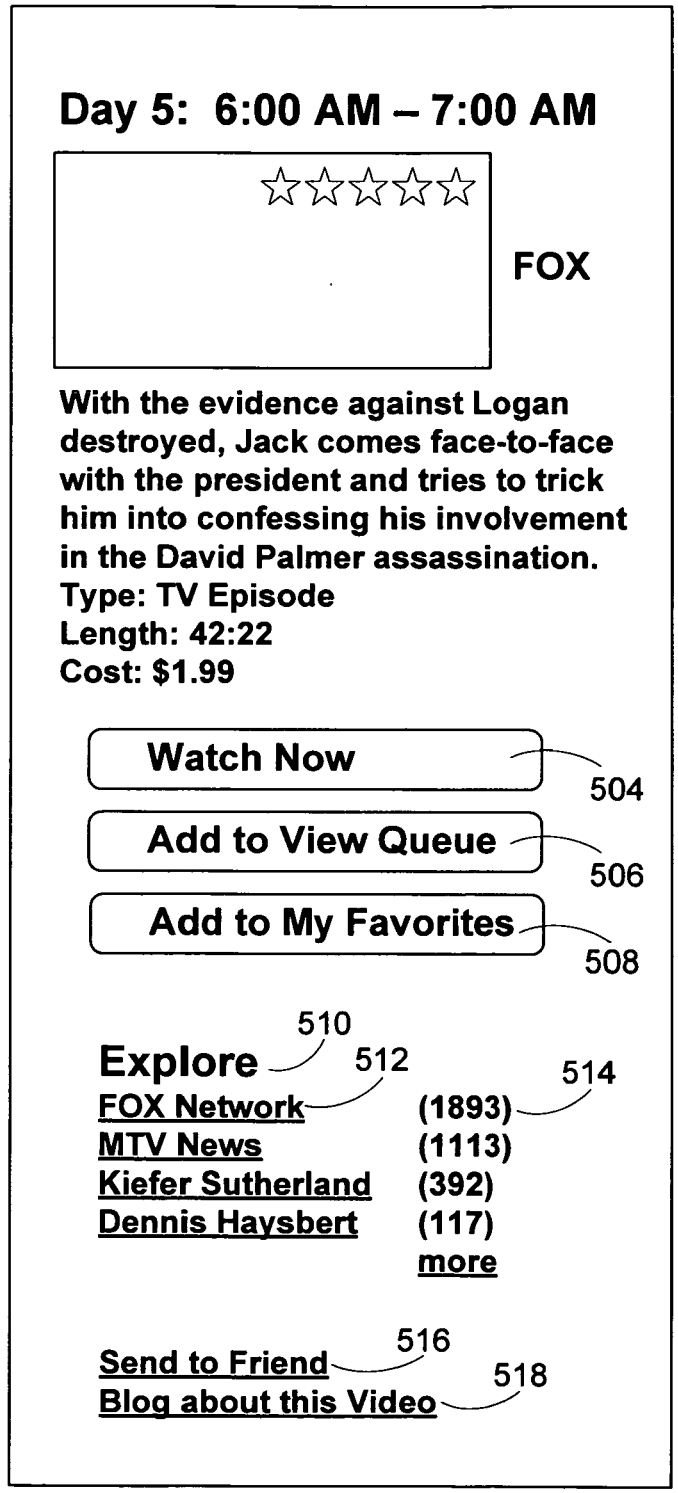

When a user selects a video from either mosaic 208 or the recommended videos, right column 206 (FIG. 2) may display options to the user for the selected video, as shown in FIG. 5. In addition, more information about the video may be displayed. FIG. 5 shows the result of selecting the first video in FIG. 4 or one of the videos of mosaic 208. In addition to informational content about the selected video, selectable options 504, 506, 508, 510, 516, and 518 are presented to the user. Selectable button 504 opens a new display or overlay and directs the user to the website where the video is provided. Selectable button 506 adds the current video to view queue 244 (FIG. 2), and selectable button 508 adds the video to a user's favorites list.

Options 510 provide links related to the currently displayed video. Thus, if the user enjoys the video, the user may be directed to related videos. Related videos are presented to the user as keywords 512. Keywords 512 may be actors or other celebrities associated with the video, the network the program is on, related networks, or any other keywords associated with the video. Next to each keyword in the list is a number 514 that corresponds to the number of available videos related to the keyword. For example, in FIG. 5, Kiefer Sutherland is an actor in the selected show, and there are 392 available videos with that actor. If the user chooses selectable link 520, mosaic 208 (FIG. 2) is reflected to include the 392 videos. Rightmost column 206 may then revert to providing recommendations to the user based on the selected keyword (FIG. 4).

Column 500 may present other options related to the selected video, including "Send to Friend" 516 and "Blog about this Video" 518 features. Feature 516 allows a user to notify a friend about the current video. In one embodiment of the invention, the URL of the website that provides the video may be sent to the e-mail address of a friend or may be sent to a friend using any other suitable means. In another embodiment of the invention, the video may be added to a recommended list in the friend's user profile, which the friend may access when he or she accesses his or her account on the media guidance application. An e-mail, or any other method for distributing information, may also be sent to the friend to notify the friend that a new recommendation has been added.

Feature 518 may direct the user to a new display screen (not pictured). The display screen may allow the user to enter his or her thoughts or comments about a video after viewing the video. These thoughts may be saved in a blog associated with the user. The blog may contain various entries, where each entry corresponds to a particular video or related media information about the video (e.g., a particular genre, show, channel, actor, etc.). In some embodiments, by selecting option 518, an entry about the video may be automatically started.

The blog may be stored in a user profile. The blog may be saved on the user's device and may be only accessible to the user. Alternatively, the blog may be saved remotely, and the blog may be accessible to users designated as a friend or may be open to the public to read.

Other features that may be provided to a user by column 500, but are not shown to avoid cluttering the figure, are options to rate the video, visit a forum about the video, or go to a wiki-able page about the video. If desired, the user may be directed to a forum to discuss the video or a topic related to the video (e.g., the television show, the network providing the video, actors in the video, etc.). The user may also go to a wiki-able page about the video or a topic related to the video to share information with other guidance application users.

A media guidance application, such as an application that provides display screen 200 of FIG. 2, may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., recommended media content, etc.), aspects of criteria elements displayed (e.g., ordering of categories or criteria elements, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 11. Additional personalized media guidance application features are described in greater detail in Ellis et al., U.S. patent application Ser. No. 11/179, 410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Figure 6:
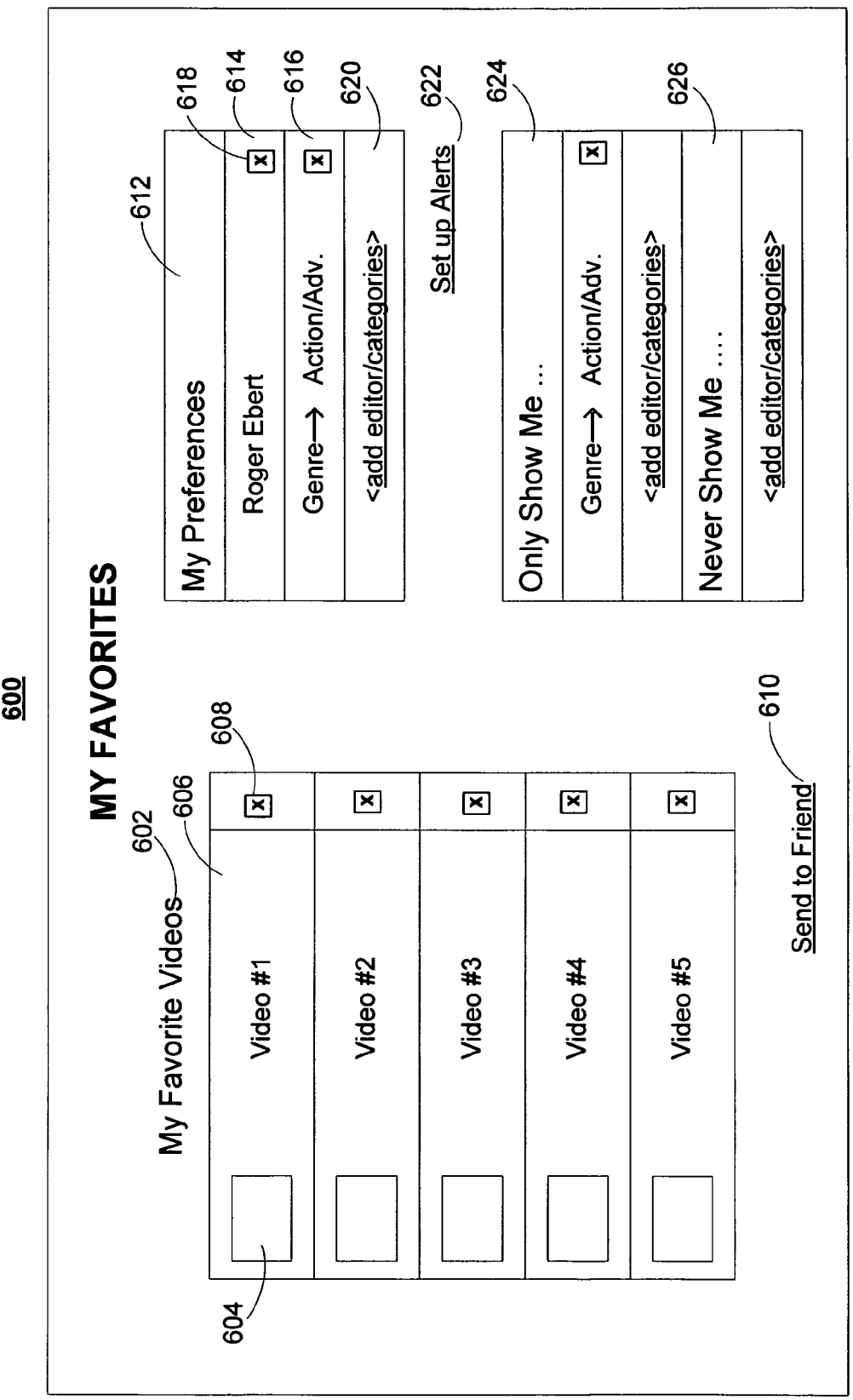
FIG. 6 shows an illustrative display screen for viewing and updating user favorites and preferences.

A user may enter preferences to customize the display provided by a guidance application, such as through display 600 in FIG. 6. The user preferences may be saved in a user profile associated with the user. User interface 600 may display the user's favorite videos, the user's display preferences, and may allow the user to add or remove preferences. My Favorite Videos list 602 is a list of videos, where each video has been marked as a favorite by the user by, for example, selecting the "Add to My Favorites" selectable button 508 (FIG. 5). Each entry in the list may be identified by a graphical identifier 604 (e.g. screenshot/thumbnail) and textual information 606. Textual information 606 may include the title of the video, the length of the video, the date that the video became available, and any other relevant information. The "close" indicator 608 next to each video in list 602 allows the user to remove any individual video from the list. My Favorite Videos list 602 may be different from view queue 246 for at least the reason that the favorites list is saved more permanently (e.g., in a user profile). The user may therefore leave the guidance application and return to the application at a later time without losing the information saved in display 600. Below favorites list 602 is "Send to Friend" link 610. Link 610 allows the user to send the videos in the user's favorites list to a friend. Favorites list 602 may be sent to a friend using any of the techniques described in connection with link 516 in FIG. 5.

A user may enter viewing preferences in My Preferences list 612. My Preferences list 612 may include one or more of the user's favorite editors 614. My Preferences list 612 may include one or more favorite types of videos 616. Any of the selectable criteria elements available in left column 202 (FIG. 2) (e.g., a criteria element within genre, channels, shows, hotlists, video type, etc.) of user interface 200 may be included in My Preferences list. Any of the preferences entered by the user may be removed by selecting button 618 corresponding to the preference, and preferences may be added by selecting link 620. Link 620 may bring the user to a new screen (not pictured) or overlay where the user is allowed to choose additional options to include in My Preferences.

Link 622 may be used to set up alerts when new videos of interest to the user are available. The user may be notified when a new video becomes available that meets one or more criteria elements in My Preferences list 612. The user may set up the alerts so that any or all of the criteria elements are used to trigger an alert. The alerts may be in e-mail, text-message, or other suitable form for delivering the news that new videos of interest to the user have become available.

User interface 200 (FIG. 2) may be customized based on the preferences entered into lists 624 and 626. List 624 excludes any videos from being displayed that do not possess a property of at least one of the criteria elements in the list. For example, in illustrative user interface 600, the user has designated that he or she only wants to view results that are in the genre of action/adventure. The filtering effect of list 624 may only occur if at least one criteria element is selected.

List 626 may exclude videos that satisfy any of the criteria elements in the list to be presented to the user. Therefore, if list 620 is empty, then list 620 has no effect on the videos that are presented to the user. By using either list 624 or list 626, the user has significant control over what types of videos may or may not be returned in any searches. Display 600 may also include other options for customizing user interface 200. In some embodiments, a user may change the format or options of left column 202. The user may include or exclude categories from being displayed. The user may choose the order in which the categories or criteria elements are displayed.

Figure 7:
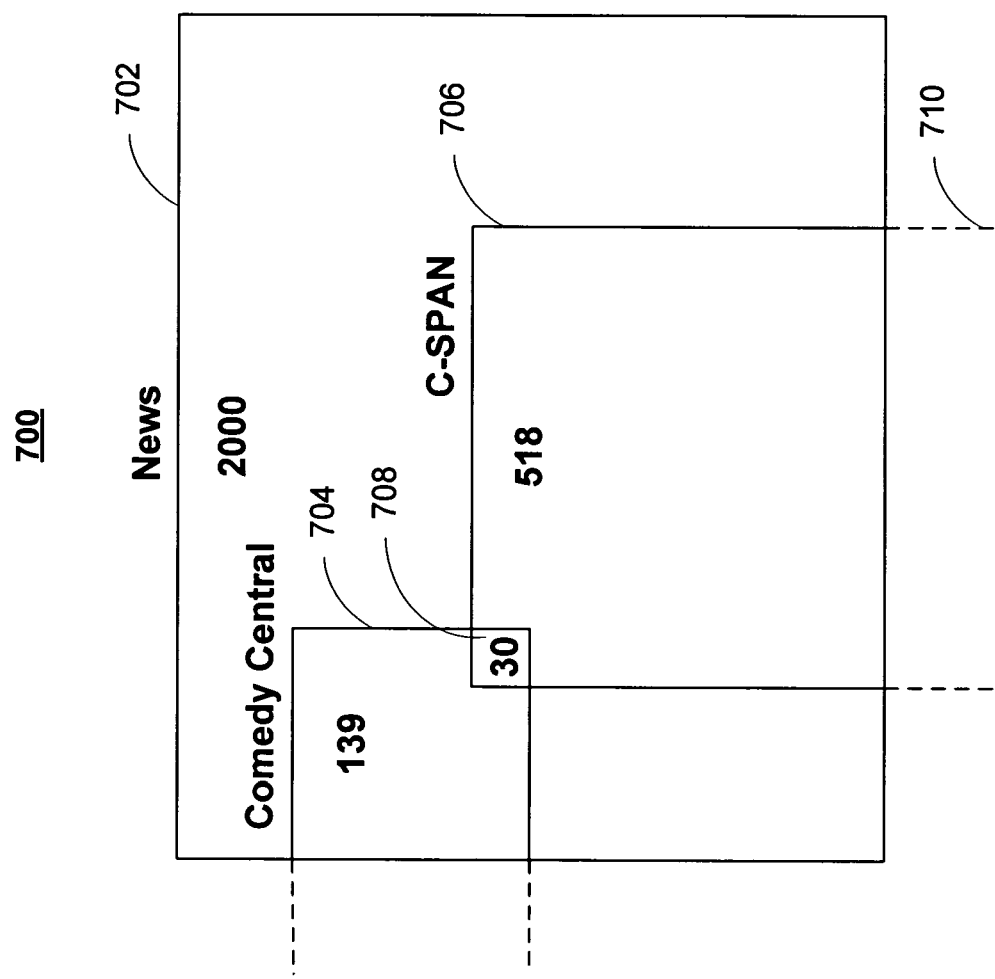
FIG. 7 shows a Venn diagram of available online videos used by FIGS. 8A-AC, 9A, and 9B.

FIG. 7 shows illustrative Venn diagram 700 of available videos in the News category. As shown in Venn diagram 700, 2000 videos are available for display to the user in the genre of news 702. Of the 2000 news videos, 139 videos are related to the channel, Comedy Central 704. Also, 518 of the 2000 news videos are related to the channel, C-SPAN 706. There are more videos related to the two channels than those shown in the Venn diagram, but these are not in the news genre. This is indicated by dotted lines 710 that extend outside of news box 702. Finally, 30 videos in the news genre, as indicated by box 708, are related to both Comedy Central and C-SPAN.

The example display screens shown in FIGS. 8A-8C and 9A-9B illustrate typical usage scenarios of user interface 200 and in particular, left column 202 (FIG. 2). The scenarios are described with reference to Venn diagram 700 in FIG. 7. At various stages, column 202 (FIG. 2) may take the form of columns 800A-800C in FIGS. 8A-8C. In this scenario, column 202 (FIG. 2) is used as a scope narrowing mechanism, whereby the number of identified videos decreases with each selected criteria element. Initially, column 202 may include categories for genre, channels, shows, and hotlists. The genre category may default to being selected, and criteria elements of the genre category are displayed. (See FIG. 2) Upon user selection of the criteria element, "News" 802, in the genre category, the criteria element is listed below the genre category heading and above the window of selectable elements. Next to selected criteria element 804 is "close" button 806, which may be used to deselect the criteria element, and remove the criteria element from its position above window 812. Following user selection of the news genre, available online videos in the news genre are identified. The number of identified videos, or 2000, is displayed at 708, which is consistent with the number of available news videos in Venn diagram 700.

If a user selection of the category, channels 810, is received, window 812 of selectable elements corresponding to the genre category is closed. Window 814, corresponding to the channels category, is presented below the channels category heading. The criteria elements in window 814 each have videos in the news genre. Channels that do not have videos in the news genre are not included in window 814. When a user selection of criteria element 816 (Comedy Central) is received, as before, the criteria element 818 is moved to below the category heading, and "close" button 820 is provided next to the criteria element. Following user selection of the Comedy Central channel criteria element, available online videos are identified that are both in the news genre and related to Comedy Central. The number of identified videos, or 139, is shown at 822. Thus, of the 2000 videos in the news genre, only 139 of them are related to Comedy Central, and the scope of the video set is narrowed accordingly. This is consistent with 704 in Venn diagram 700.

Figure 8C:
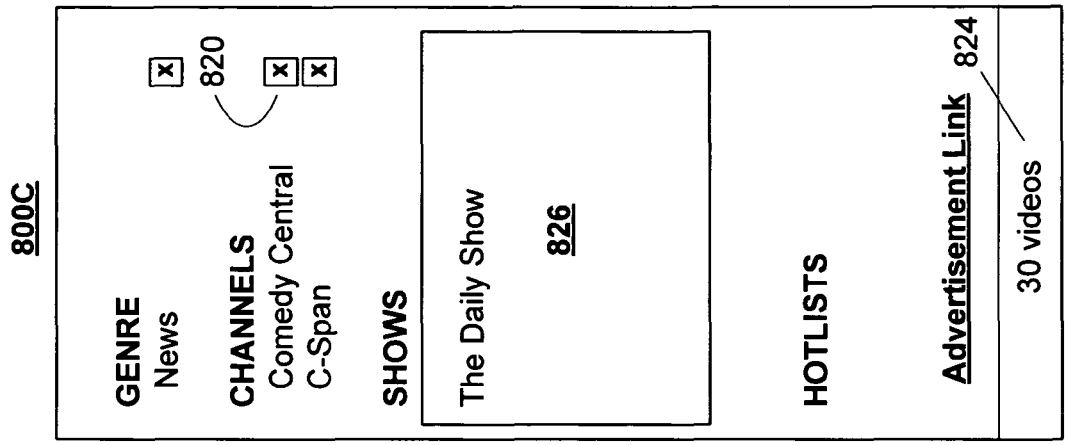
FIG. 8A-8C are illustrative stages of a portion of the display screen in FIG. 2 in a typical usage scenario.

Following a selection of C-SPAN in the channels category, the remaining number of videos, or 30, is displayed in 824 of FIG. 8C. Thus, of the 139 videos meeting both the news and Comedy Central criteria, only 30 of the videos are also related to C-SPAN. This number is consistent with 708 in Venn diagram 700. If the show category is selected, window 814 is closed and a new window corresponding to television shows, window 826, is presented below the shows category heading. Note that only one show, The Daily Show, is listed in the window. This indicates that all 30 of the videos that are news-based, related to Comedy Central, and related to C-SPAN are on, or at least related to, The Daily Show.

If a user indication is received to remove the Comedy Central criteria element (e.g. if user selection of button 820 is received), the identified videos only need to meet the news and C-SPAN criteria, which, according to Venn diagram 700, would result in 818 videos. This may then be reflected on the user interface (not pictured). The criteria elements would change accordingly, and would include shows that have available videos that meet both the news and C-SPAN criteria.

Figure 8B:
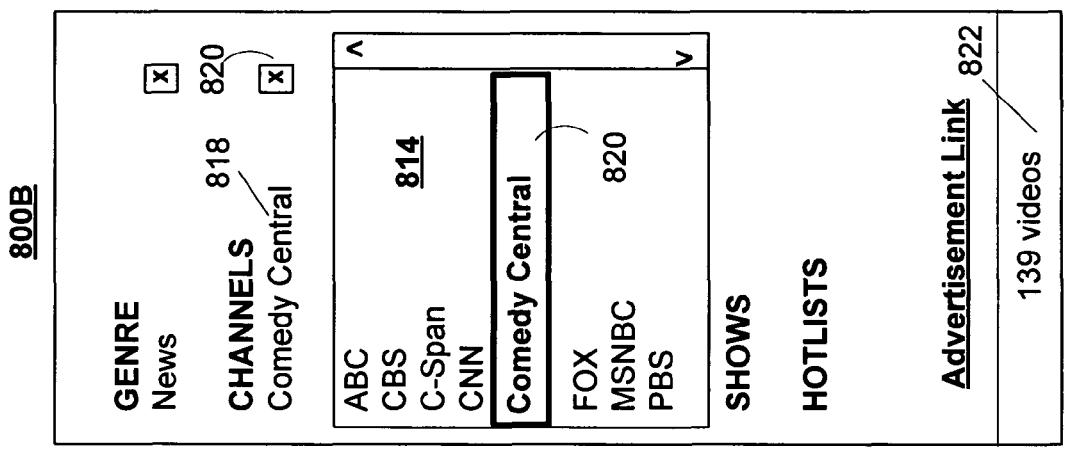
Figure 8A:
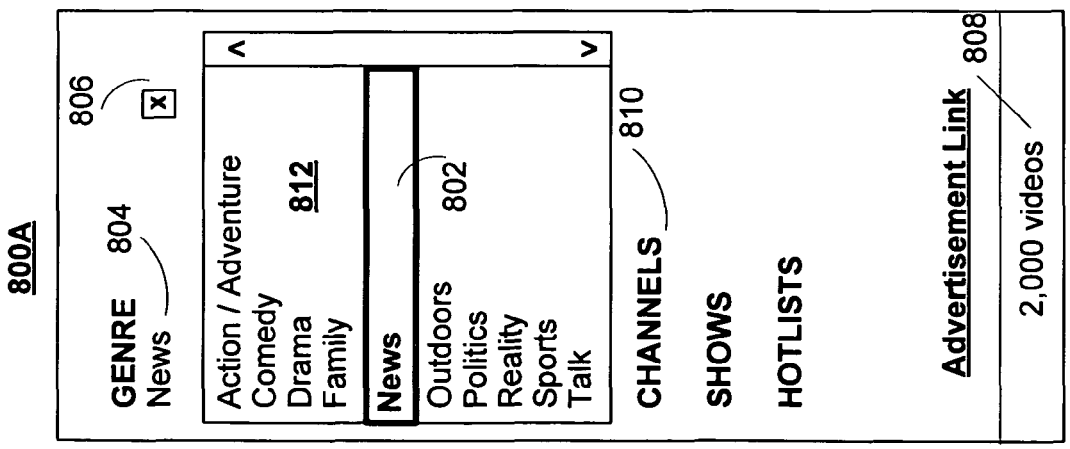
Figures 9A, 9B:
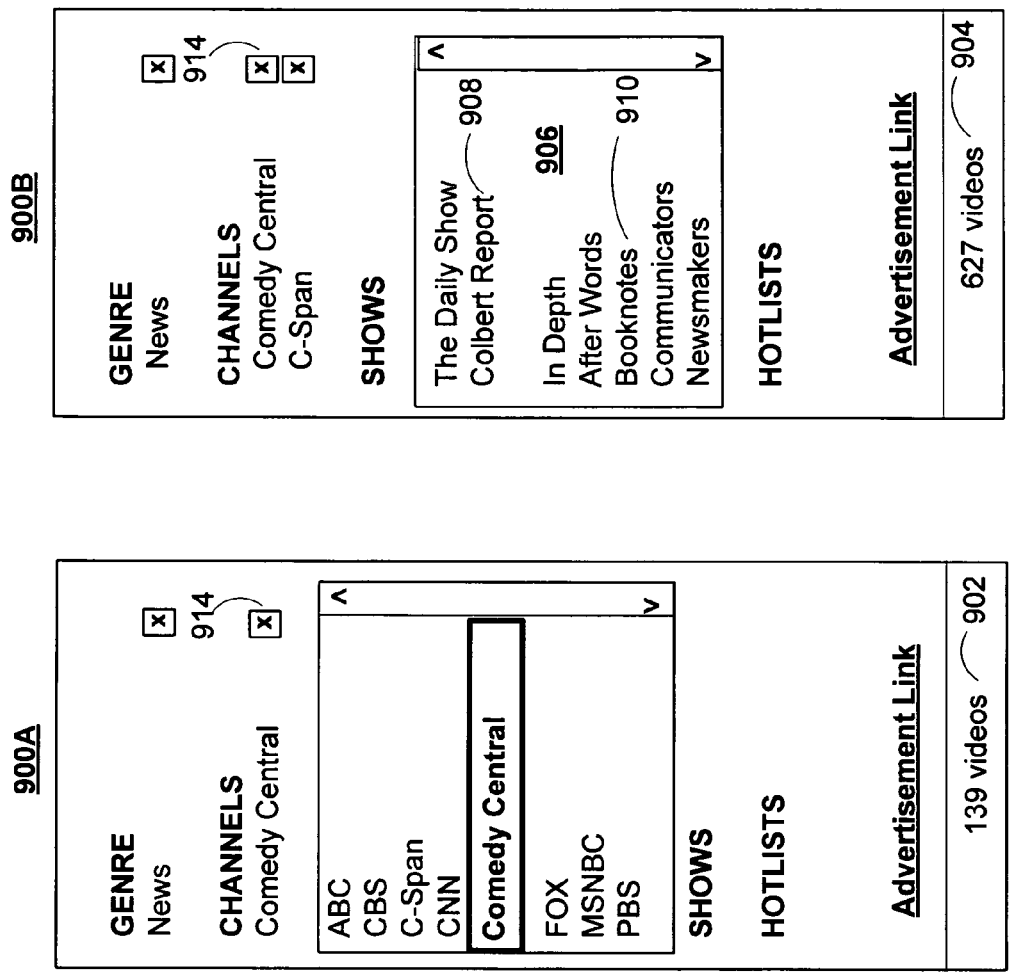
FIGS. 9A and 9B are illustrative stages of a portion of the display screen in FIG. 2 in a typical usage scenario.

Column 202 (FIG. 2) may also take on the forms of 900A and 900B in FIGS. 9A and 9B. In this usage scenario, the scope narrowing mechanism may at times increase the set of identified videos with subsequent selections of criteria elements. The steps involved in reaching the configuration shown in FIG. 9A may be achieved by the steps discussed above in connection with FIGS. 8A and 8B. Thus, for convenience, FIG. 8B is reproduced as FIG. 9A. In FIG. 9A, the news criteria element of the genre category and the Comedy Central criteria element of the channels category have been selected, and criteria elements of the channel category are displayed. This results in 139 videos, as is consistent with Venn diagram 700.

Following a selection of C-SPAN in the channels category, the identified videos are expanded to include news-related videos in either Comedy Central or C-SPAN. Accordingly, the number of identified videos, shown at 904, is increased from 139 to 627 videos. As can be seen from viewing a window 906 of selectable criteria elements in the shows category (e.g., by selecting the shows category), news-related shows from both Comedy Central and C-SPAN are listed. Note that in window 906, videos from each channel are separated (shows 908 are from Comedy Central and shows 910 are from C-SPAN) to show that they meet different criteria elements in another category. In some embodiments, the criteria elements are displayed together (e.g., alphabetically) without regard to the selected criteria elements in other categories.

If a user indication is received to remove the Comedy Central criteria element (e.g. if user selection of button 914 is received), the set of videos may be narrowed. In this case, the identified videos would need to meet the news and C-SPAN criteria, which, according to Venn diagram 700, would reduce the set of videos from 627 to 518. This may then be reflected in the user interface (not pictured). The criteria elements would change accordingly, and would include shows that have available videos that meet both the news and C-SPAN criteria.

Figure 10:
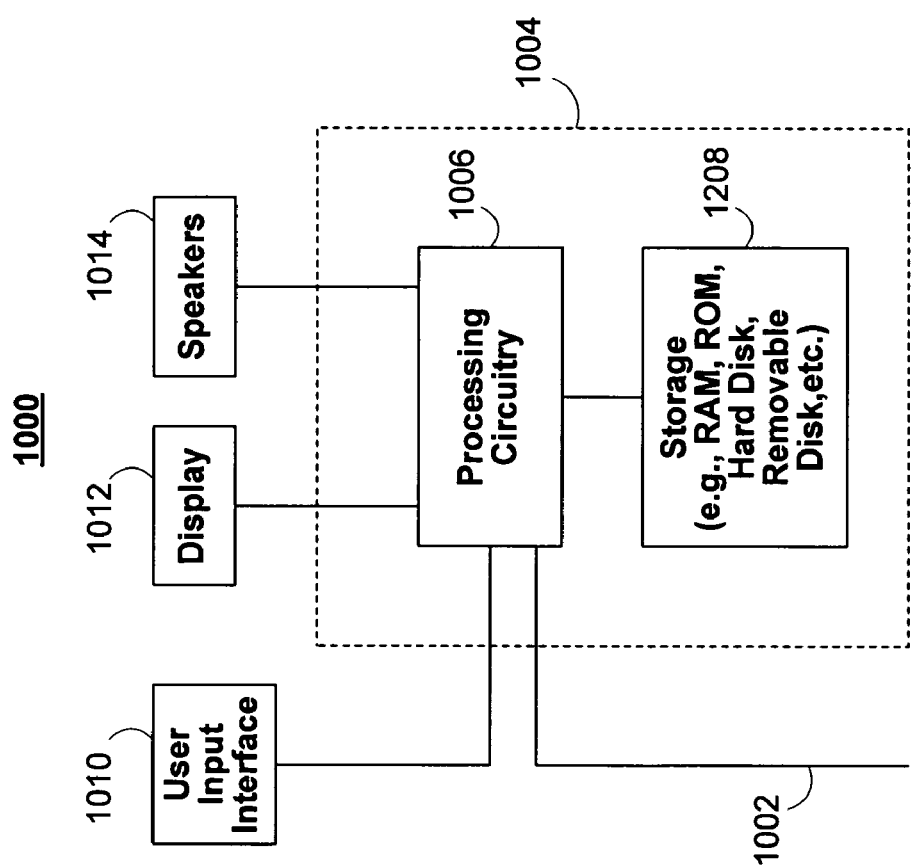
FIG. 10 shows an illustrative user equipment device in accordance with one embodiment of the invention.

Users may access media content and the media guidance application (and its display screens described above) from one or more of their user equipment devices. FIG. 10 shows a generalized embodiment of illustrative user equipment device 1000. More specific implementations of user equipment devices are discussed below in connection with FIG. 11. User equipment device 1000 may receive media content and data via input/output (hereinafter "I/O") path 1002. I/O path 1002 may provide media content (e.g., broadcast programming, on-demand programming, Internet content, and other video or audio) and data to control circuitry 1004, which includes processing circuitry 1006 and storage 1008. Control circuitry 1004 may be used to send and receive commands, requests, and other suitable data using I/O path 1002. I/O path 1002 may connect control circuitry 1004 (and specifically processing circuitry 1006) to one or more communications paths (described below). I/O functions may be provided by one or more of these communications paths, but are shown as a single path in FIG. 10 to avoid overcomplicating the drawing.

Control circuitry 1004 may be based on any suitable processing circuitry 1006 such as processing circuitry based on one or more microprocessors, microcontrollers, digital signal processors, programmable logic devices, etc. In some embodiments, control circuitry 1004 executes instructions for a media guidance application stored in memory (i.e., storage 1008). In client-server based embodiments, control circuitry 1004 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications involve the Internet for at least obtaining online media content and additionally may involve any other suitable communications networks or paths (which is described in more detail in connection with FIG. 11). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 1008 that is part of control circuitry 1004. Storage 1008 may include one or more of the above types of storage devices. For example, user equipment device 1000 may include a hard drive for a DVR (sometimes called a personal video recorder, or PVR) and a DVD recorder as a secondary storage device. Storage 1008 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 1004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1004 may also include scaler circuitry for upconverting and downconverting media into the preferred output format of the user equipment 1000. Circuitry 1004 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1008 is provided as a separate device from user equipment 1000, the tuning and encoding circuitry (including multiple tuners) may be associated with storage 1008.

A user may control the control circuitry 1004 using user input interface 1010. User input interface 1010 may be any suitable user interface, such as a remote control, mouse, trackball, keypad, keyboard, touch screen, touch pad, stylus input, joystick, voice recognition interface, or other user input interfaces. Display 1012 may be provided as a stand-alone device or integrated with other elements of user equipment device 1000. Display 1012 may be one or more of a monitor, a television, a liquid crystal display (LCD) for a mobile device, or any other suitable equipment for displaying visual images. In some embodiments, display 1012 may be HDTV-capable. Speakers 1014 may be provided as integrated with other elements of user equipment device 1000 or may be stand-alone units. The audio component of videos and other media content displayed on display 1012 may be played through speakers 1014. In some embodiments, the audio may be distributed to a receiver (not shown), which processes and outputs the audio via speakers 1014.

Figure 11:
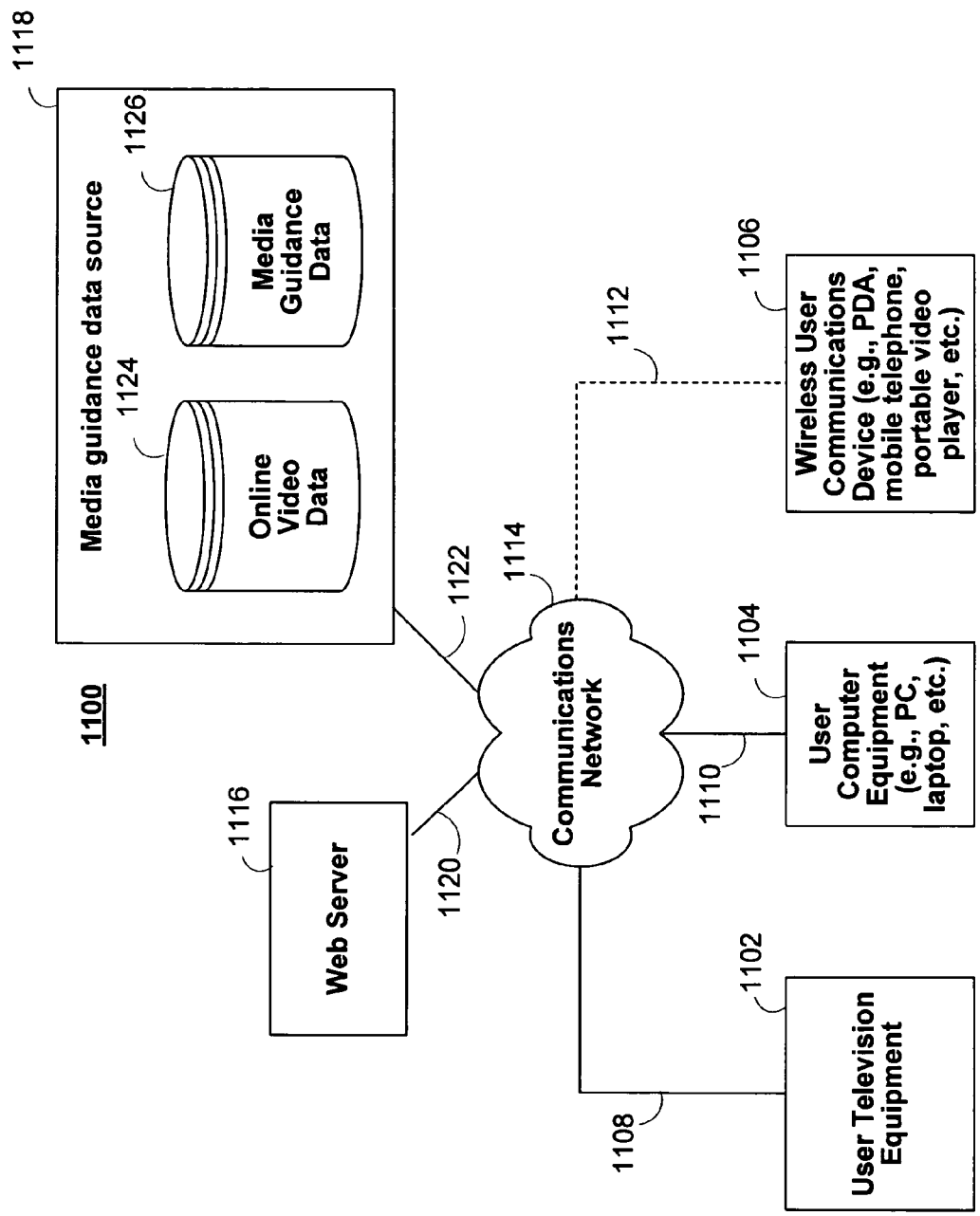
FIG. 11 shows an illustrative user equipment device in accordance with one embodiment of the invention.

User equipment device 1000 of FIG. 10 can be implemented in system 1100 of FIG. 11 as user television equipment 1102, user computer equipment 1104, wireless user communications device 1106, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 1102 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 1104 may include a PC, a laptop, a tablet, a WebTV box, a personal computer television (PC/TV), a PC media server, a PC media center, or other user computer equipment. WEBTV is a trademark owned by Microsoft Corp. Wireless user communications device 1106 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 1102, user computer equipment 1104, and wireless user communications device 1106 may utilize at least some of the system features described above in connection with FIG. 10 and, as a result, include flexibility with respect to the type of media content available on the device. For example, user television equipment 1102 may be Internet-enabled allowing for access to Internet content, while user computer equipment 1104 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 1100, there is typically more than one of each type of user equipment device but only one of each is shown in FIG. 11 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 1114. Namely, user television equipment 1102, user computer equipment 1104, and wireless user communications device 1106 are coupled to communications network 1114 via communications paths 1108, 1110, and 1112, respectively. Communications network 1114 include the Internet and additionally be may be one or more other networks including, a mobile phone network, mobile device (e.g., Blackberry) network, cable network, public switched telephone network, or other types of communications network or combinations of communications networks. BLACKBERRY is a trademark owned by Research In Motion Limited Corp. Paths 1108, 1110, and 1112 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 1112 is drawn with dotted lines to indicate that in the exemplary embodiment shown in FIG. 11 it is a wireless path and paths 1108 and 1110 are drawn as solid lines to indicate they are wired paths (although these paths may be wireless paths, if desired). Communications with the user equipment devices may be provided by one or more of these communications paths, but are shown as a single path in FIG. 11 to avoid overcomplicating the drawing.

Although communications paths are not drawn between user equipment devices, these devices may communicate directly with each other via communication paths, such as those described above in connection with paths 1108, 1110, and 1112, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 1114.

System 1100 includes web server 1116 and media guidance data source 1118 coupled to communications network 1114 via communication paths 1120 and 1122, respectively. Paths 1120 and 1122 may include any of the communication paths described above in connection with paths 1108, 1110, and 1112. Communications with the web server 1116 and media guidance data source 1118 may be exchanged over one or more communications paths, but are shown as a single path in FIG. 11 to avoid overcomplicating the drawing. In addition, there may be more than one of each of web server 1116 and media guidance data source 1118, but only one of each is shown in FIG. 11 to avoid overcomplicating the drawing. (The different types of each of these sources are discussed below.) If desired, web server 1116 and media guidance data source 1118 may be integrated as one source device. Although communications between sources 1116 and 1118 with user equipment devices 1102, 1104, and 1106 are shown as through communications network 1114, in some embodiments, sources 1116 and 1118 may communicate directly with user equipment devices 1102, 1104, and 1106 via communication paths (not shown) such as those described above in connection with paths 1108, 1110, and 1112.

Online media may be provided by web server 1116. Web server 1116 may provide a website of an online media provider (e.g., television network website, entertainment website, movie website, or a website that aggregates content from multiple sources). The online media provider may host a variety of content (e.g., full-length movies/television episodes, segments of movies/episodes, trailers/previews, interviews with actors/directors/producers, music videos, original online-only content, promotions for a network or program, etc.). The online media provider may host media of various types (e.g. streaming, downloadable, user generated, professionally generated, etc.). The provided online media may be stored locally at web server 1116 or in a remote media server. In addition to the media content, web server 1116 may store metadata (e.g., title, description, URL, etc.) for each provided media.

One or more of other media sources (not shown) may also provide media content to user equipment, and be connected to the communications network by one or more paths that may include any of the communication paths described above in connection with paths 1108, 1110, and 1112. Other media sources may include one or more types of media distribution equipment including a television distribution facility, cable system headend, satellite distribution facility, programming sources (e.g., television broadcasters, such as NBC, ABC, HBO, etc.), intermediate distribution facilities and/or servers, on-demand media servers, and other media content providers. NBC is a trademark owned by the National Broadcasting Company, Inc., ABC is a trademark owned by the ABC, INC., and HBO is a trademark owned by the Home Box Office, Inc. Other media sources may be the originator of media content (e.g., a television broadcaster, a Webcast provider, etc.) or may not be the originator of media content (e.g., an on-demand media content provider, etc.). Other media sources may include cable sources, satellite providers, on-demand providers, or other providers of media content. Other media sources may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 1118 may provide media guidance data for a media guidance application. Media guidance data source 1118 includes data store 1124 and 1126, and may provide guidance data from either data store. The guidance data may include program information such as a program title, an episode title, an episode synopsis, editorial commentary, etc., typically found in, for example, TV Guide Magazine or on www.tvguide.com. Data stores 1124 and 1126 may be one or more relational databases or other suitable storage mechanisms. Data stores 1124 and 1126 may be local (as shown in system 1100) or in remote locations.

Data store 1126 stores media guidance data that may or may not be available online. The stored media guidance data may include media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g. MPEG), advertisement information (e.g. text, images, media clips, etc.), and any other type of guidance data that is helpful for a user to navigate among and locate desired media selections. Data store 1126 may also store identifiers into data store 1124 that reference related media.

Media guidance data source 1118 may also include data store 1124. Data store 1124 stores information related to the videos available on web servers 1116. Data store 1124 may store the metadata (e.g., title, description, URL, etc.) associated with each video from web servers 1116, or may store information derived from the metadata. Data store 1124 may also store metadata not provided from web servers 1116 (e.g., date entered into data store 1124, popularity, user generated tags/keywords, etc.). Data store 1124 may store identifiers into data store 1126 to indicate additional media guidance data related to the videos found from web servers 1116. In some embodiments, data store 1124 stores the online media provided by web servers 1116 along with information about the media.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 1118 and/or other media sources may be provided to users' equipment using a client-server approach. For example, a guidance application client residing on the user's equipment may initiate sessions with source 1118 to obtain guidance data when needed. Media guidance data source 1118 may provide user equipment devices 1102, 1104, and 1106 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 1011 of user equipment device 1000 and partially on a remote server as a server application (e.g., media guidance data source 1118). The guidance application displays may be generated by the media guidance data source 1118 and transmitted to the user equipment devices. The media guidance data source 1118 may also transmit data for storage on the user equipment, which then generates the guidance application displays based on instructions processed by control circuitry.

Media guidance system 1100 is intended to illustrate a number of approaches, or network configurations, by which user equipment devices and sources of media content and guidance data may communicate with each other for the purpose of accessing media, including Internet-delivered content, and providing media guidance. The present invention may be applied in any one or a subset of these approaches, or in a system employing other approaches for delivering media and providing media guidance. The following three approaches provide specific illustrations of the generalized example of FIG. 11.

In one approach, user equipment devices may communicate with each other within a home network. User equipment devices can communicate with each other directly via short-range point-to-point communication schemes describe above, via indirect paths through a hub or other similar device provided on a home network, or via communications network 1114. Each of the multiple individuals in a single home may operate different user equipment devices on the home network. As a result, it may be desirable for various media guidance information, including media guidance information for Internet-delivered content, or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit online media content from user computer equipment to a portable video player or portable music player.

In a second approach, users may have multiple types of user equipment by which they access media content, including Internet-delivered media content, and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with web servers 1116 or other media content sources to access Internet-delivered and other media content. Specifically, within a home, users of user television equipment 1104 and user computer equipment 1106 may access the media guidance application to navigate among and locate desirable media content. Users may also access the media guidance application outside of the home using wireless user communications devices 1106 to navigate among and locate desirable media content.

It will be appreciated that while the discussion of media content has focused on video content, the principles of media guidance can be applied to other types of media content, such as music, images, etc.

Figure 12:
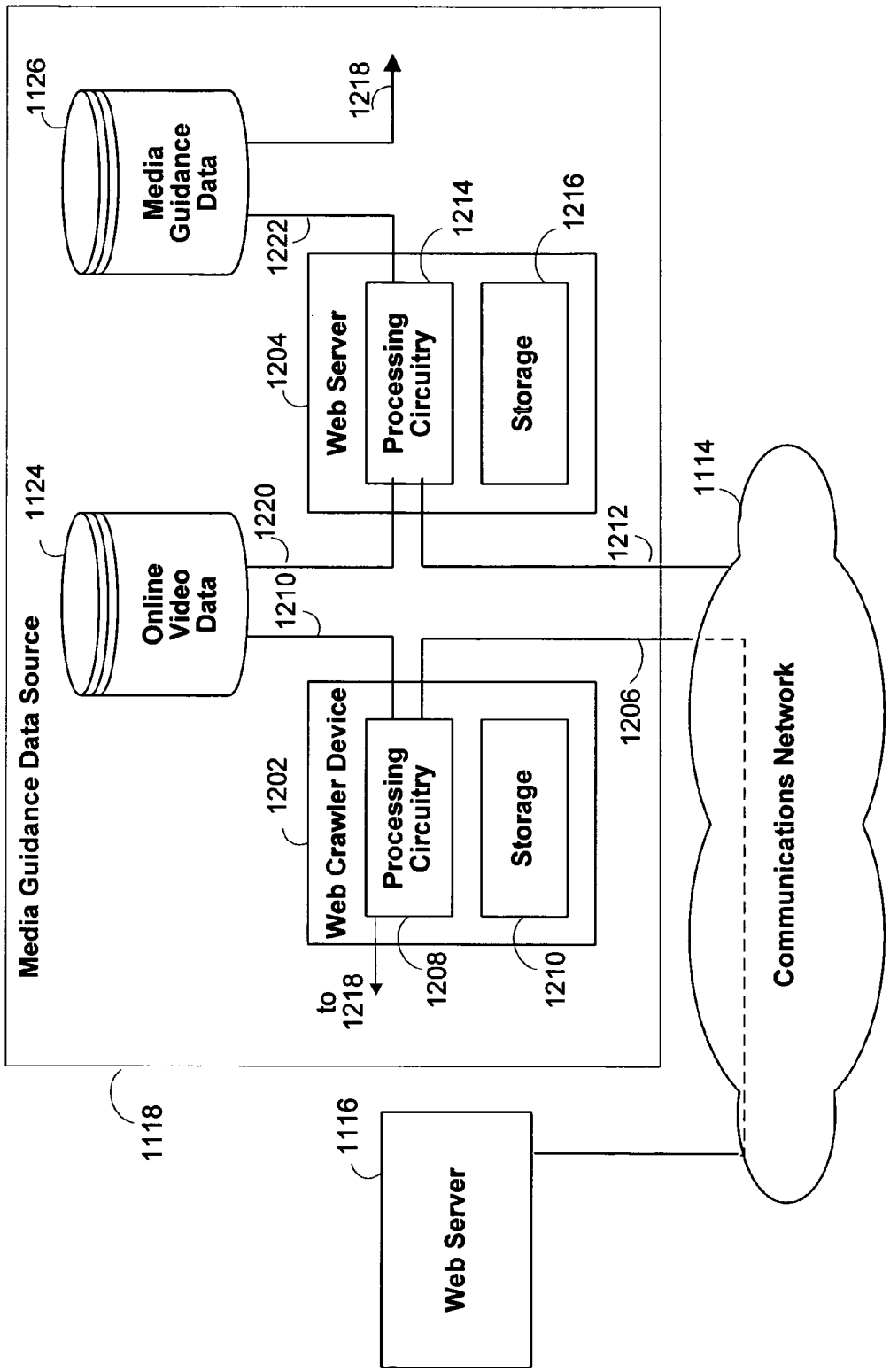
FIG. 12-13 show detailed views of an illustrative media guidance source.

A more detailed view of an embodiment of media guidance data source 1118 is shown in FIG. 12. In addition to data stores 1124 and 1126, media guidance data source 1118 may contain web crawler device 1202 and web server 1204. Web crawler device 1202 and web server 1204 may each include one or more of processing circuitry 1214 and 1208, and storage 1216 and 1210. They may include any of the features and components of a user equipment device, described above in connection with FIG. 10. They may additionally include any circuitry or stored software (e.g., database drivers, web crawler device applications, web server applications, etc.). Web crawler device 1202 and web server 1204 interact with data stores 1124 and 1126 through I/O paths 1210, 1218, 1220, and 1222. Web crawler device 1202 and web server 1204 communicate with communications network 1114 through I/O paths 1206 and 1212, which are referred to collectively as link 1122 in FIG. 11. I/O paths 1206, 1210, 1212, 1218, 1220, and 1222 may be any suitable communication paths described above in connection with 1108, 1116, and 1112. Although web crawler device 1202 and web server 1204 are shown as separate entities, their functions may be performed by a single unit.

In a typical scenario, web crawler device 1202 obtains online media information (e.g., metadata) and, in some embodiments, online media content originally provided from web servers 1116. That is, web crawler device 1202 captures information on online media available on the Internet. In FIG. 12, a dotted line is shown between link 1206 and web server 1116 to indicate that web crawler device 1202 directly requests media and media information from web server 1116. Web crawler device 1202 may then store information on the available online media in data store 1124. To do so, web crawler device 1202 may access, retrieve, add, update, or remove data from data store 1124. Web crawler device 1202 may store information on web servers 1116 in storage 1210. Thus, web crawler device 1202 may store captured information directly in data store 1124 or may first process the captured information using related data in data store 1126 and/or storage 1210.

In a typical scenario, web server 1204 may access or retrieve data from data store 1124 and 1126. Web server 1204 may use retrieved data from either or both data stores to provide media guidance application data for a media guidance application. Web server 1204 may store user personalization data (e.g., user profiles) in storage 1216 and any other suitable information for preparing a display and/or data. Web server 1204 may provide data through I/O link 1212 using any of the approaches described above in connection with FIG. 11. For example, web server 1204 may send raw data, processed data, or may prepare a display, depending on the type of user equipment and/or guidance application.

Figure 13:
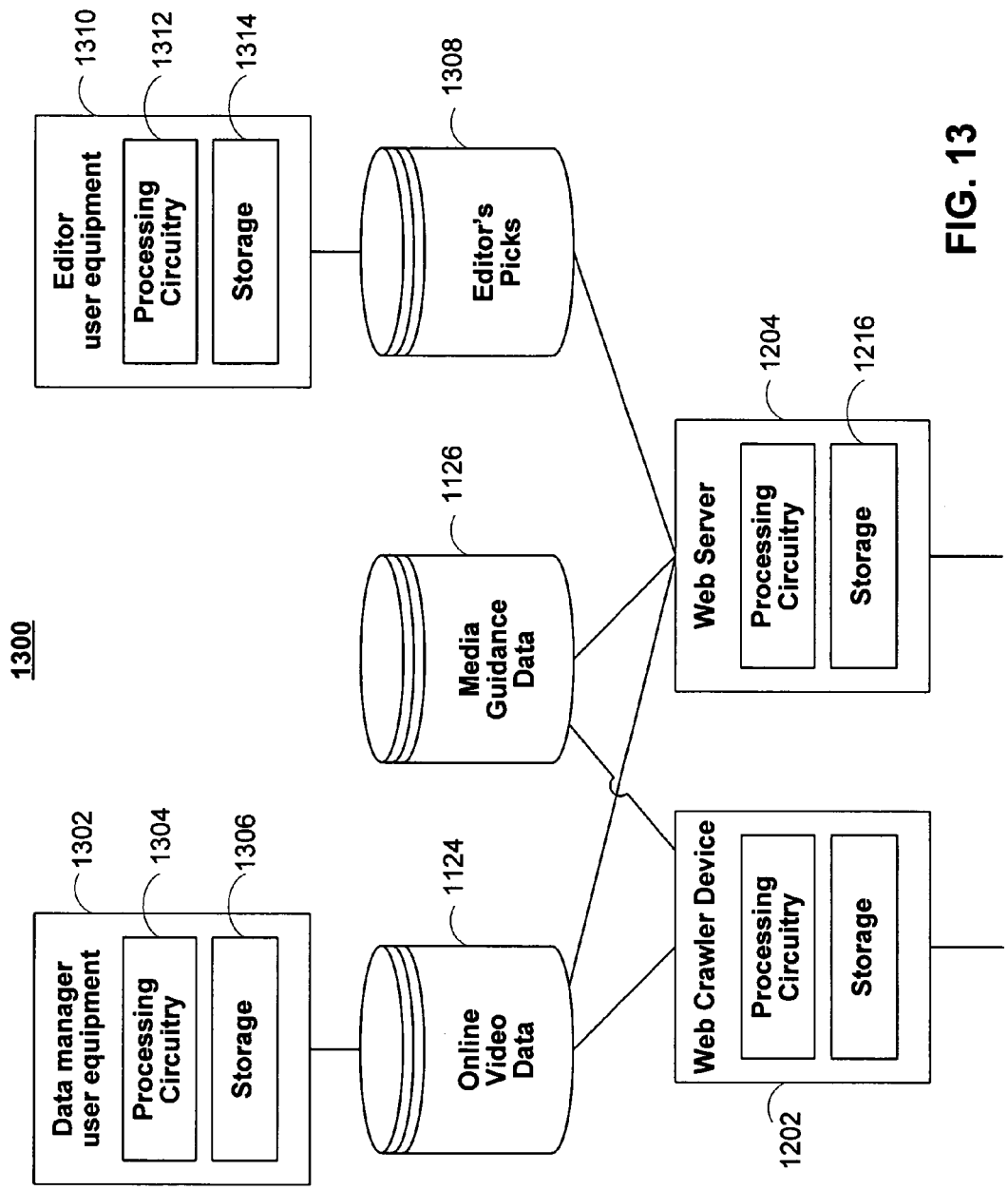

System 1300 in FIG. 13 is another illustrative embodiment of media guidance data source 1118. FIG. 13 includes the components of FIG. 12, but also includes data manager user equipment 1302, editor user equipment 1310, and editor's pick data store 1308.

Data manager user equipment 1302 may include processing circuitry 1304 and storage 1306. Data manager user equipment may be one of user equipment devices 1102, 1104, or 1106. Data manager user equipment 302 may include any or all of the components of user equipment devices. In FIG. 13, data manager user equipment 1302 is local to data store 1124, and may communicate with data store 1124 through any path described in connection with I/O paths 1108, 1116, and 1112. In some embodiments, data manager user equipment is a standard user equipment (e.g., laptop, mobile device, etc.) remote from system 1300, and a data manager may sign in to gain access through web crawler device 1202 or web server 1204. Typically, there is more than one data manager user equipment in system 1300, but only one is shown to avoid overcomplicating the drawing.

In a typical usage scenario, a data manager may use data manager user equipment to access, retrieve, add, remove, or update entries in data store 1124. Data managers may correct incorrect information about online videos, remove videos that have become unavailable, add online media information and/or online media content, add tags related to entries in data store 1126, or add any information that may be used by web crawler device 1202 and web server 1204. For example, data managers may tag certain web servers 1116 so that any listing from these tagged web servers are accentuated in the listing.

Editor's picks data store 1308 may be one or more relational databases or other suitable storage mechanisms. Editor's picks database 1308 may contain separate storage space for each editor. Editor's picks database 1308 may contain editor preference designations for an individual online media. In addition, editor's picks database 1304 may contain hotlists for each editor, where a hotlist is a list of the editor's favorite or preferred media. For each editor preference designation in editor's pick database 1308, editor's picks database 1308 may store links into data stores 1124 and 1126. The links may be used by web server 1204 when generating displays or gathering data for media guidance applications. In some embodiments, editor's picks data store 1308 is part of storage 1216 in web server 1204.

Editor user equipment 1310 may include processing circuitry 1312 and storage 1314. Editor user equipment 1310 may include the features and/or components discussed in connection with data manager user equipment 1302. Editor user equipment may communicate, either remotely or locally, with editor's picks data store 1308 through any path described in connection with I/O paths 1108, 1116, and 1112. In some embodiments, editor user equipment may have access to a portion of storage 1216 in web server 1214, and editor preference designations may be stored in storage 1216. In a typical usage scenario, an editor may enter preference designations in a manner similar to the way users enter media into a My Favorites list (see FIG. 5). Typically, there is more than one editor user equipment in system 1300, but only one is shown to avoid overcomplicating the drawing.

Figure 14:
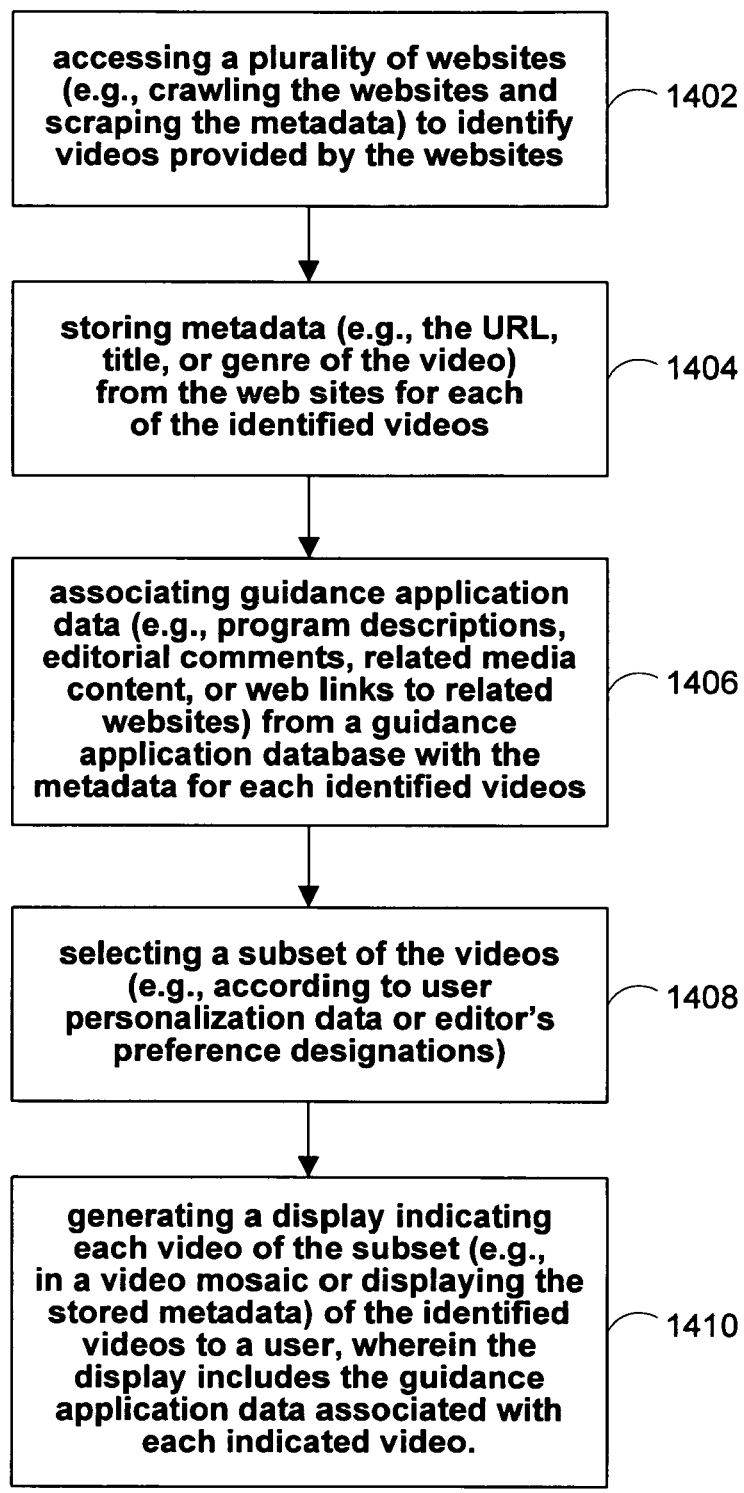
FIG. 14 shows an illustrative flow diagram for obtaining, selecting, and displaying listings.

In the present invention, an online media guidance application may choose a set of videos, and information about the chosen videos may be displayed to the user. Flow diagram 1400 of illustrative steps involved in obtaining and providing media guidance data is shown in FIG. 14. Online videos from one or more online media providers (e.g. web servers 1116) are identified and accessed at step 1402. Information for each identified video may be obtained from the online media provider. In some embodiments, a plurality of Internet sites are crawled and metadata corresponding to available videos are scraped from the Internet sites. The Internet sites may include web sites of online media providers. Video metadata may include the video title, description, video URL, source name, source URL, genre, program type (e.g., clip, full-length episode, online-only, movie trailers), screenshots/thumbnails, actors in the video, running time, character names, video format (e.g., REAL, WMV, Flash, Quicktime, etc.), active/expire date, stream/download, DRM, price, and resolution (e.g., full screen, 320×240, etc.).

The collected metadata for each identified video may be stored (e.g., in data store 1124) at step 1404. In addition, other metadata not obtained from the media provider (e.g., keywords or tags added by a data manager (e.g., from data manager user equipment 1310), user ratings, popularity, date video was found on the internet, editor preference designations, wiki-able content data, etc.) may be stored in addition to the collected metadata. The stored metadata may be updated continually, at fixed or varying time intervals, or may not be updated at all. In some embodiments, the identified online video itself (e.g., the actual video file/clip/asset) is stored as well.

At step 1406, the metadata for each of the videos may be associated with media guidance data, where the media guidance data may be stored in a media guidance database. The association may be determined based on comparing the video metadata with metadata in the media guidance database (e.g., data store 1126), or the association may be added by a data manager. In some embodiments, some of the collected metadata is used for making associations with media guidance data and is not actually stored at step 1404. In still other embodiments, a degree of relevance may be stored instead of just an association. For instance, the metadata may be compared, and a higher degree of relevance may be given to online videos that match a larger percentage of the metadata.

At step 1406, each video may be associated with one or more entries in the media guidance database. For example, the metadata for a video of a television episode may be associated with guidance data on the television show, the television episode, the actors in the show, the television network, or any editors that have commented on the episode or show. An association may be made by storing the video metadata with a tag from the media guidance database. Alternatively, associations or links between the stored metadata and the media guidance data may be saved remotely.

A subset of the videos may be selected at step 1408. The subset may be chosen automatically based on an editor's preference designations (e.g., from editor's pick database 1308) or based on user personalization data. User personalization data may be obtained from monitoring user behavior, from a user profile, or from express designations made by the user (see FIG. 6). A set of the videos may also be chosen automatically based on such criteria as the popularity or newness of the videos (see column 206 of FIG. 2).

A subset of the videos may be selected at step 1408 in response to receiving a user command. The user may enter one or more search terms or keywords (e.g., in search bar 224), and the subset of videos may be determined based on a comparison of the keywords with the stored metadata associated with each video. The user may select particular criteria elements (e.g., genre, show, channel, clip length, etc.) of interest (e.g. using column 202 of FIG. 2). The subset of videos may be those that meet the criteria, and are determined based on examining stored metadata.

There is metadata associated with both the media guidance data and the online video. Therefore, the subset of videos may be determined by comparing search terms or other criteria to either sources of metadata. In one embodiment, search terms and/or other criteria elements are compared to the metadata of the media guidance application. The comparison returns relevant media guidance data. Since there are associations linking the media guidance data to related online video, a subset of the videos may be determined. In another embodiment of the invention, the subset of videos is determined based on a comparison of search keywords and/or other criteria to the metadata of the videos. Depending on how the collected metadata is stored, the amount of metadata for each collected video, and how the associations are made, the two techniques may or may not return the same set of videos.

In some embodiments, the media guidance database includes more than media guidance data. The media guidance database also includes media, such as video media. In this case, the subset of videos identified in step 1408 may include videos identified from the internet and/or videos stored in the media guidance database.

A display indicating each video of the subset of videos is generated at step 1410. The display for each video in the subset includes guidance application data from the guidance application database. The guidance application data is determined based on the associations created in step 1406. The display may also include some or all of the collected and/or generated video metadata (e.g., in text box 308 of FIG. 3, in column 400 of FIG. 4, as keywords 512 in FIG. 5, etc.). In some embodiments, the display is a mosaic, where each video in the subset is represented by at least a graphical identifier (e.g. still image from the video). In other embodiments, the display may be text-only. Also, the displayed media listings may indicate the relevancy of each listing, where the relevancy may be determined based on a data manager's indication (see FIG. 13) or a degree of relevancy assessed when the listing was associated with media guidance data at step 1406.

Figure 15:
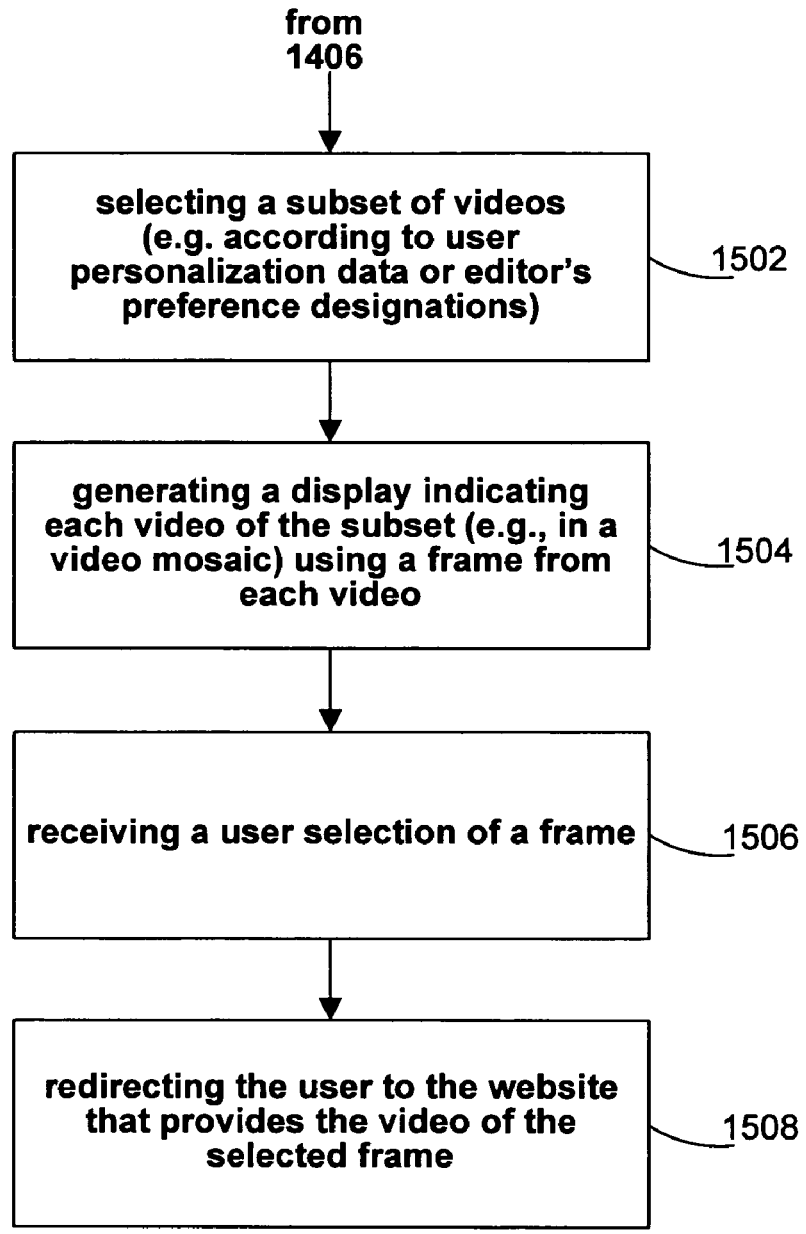
FIG. 15 shows an illustrative flow diagram for directing a user to the provider of online media content.

In some embodiments, an online media guidance application may direct a user to media content of interest to the user. Flow diagram 1500 of FIG. 15 shows illustrative steps for providing such a feature. Online media information may be obtained and processed based on the strategies discussed in steps 1404 to 1406 in FIG. 14. A subset of the videos may be identified at step 1502 using any of the techniques discussed in step 1408, including choosing videos based on user personalization data, editor's preference designations, user-entered search terms (e.g., in search bar 224 in FIG. 2), or user-selected criteria elements (e.g., in left column 202 in FIG. 2). At step 1504, a display is generated using a frame from each of the identified videos. The display may be similar to display screen 200 shown in FIG. 2. A user selection of a frame is received by the online media guidance application at step 1506. Based on the selection, at step 1508, the guidance application directs the user to the website that provides the selected media content. The website may be provided in an overlay, in a frame within the guidance application, or may be shown on the full screen.

Figure 16:
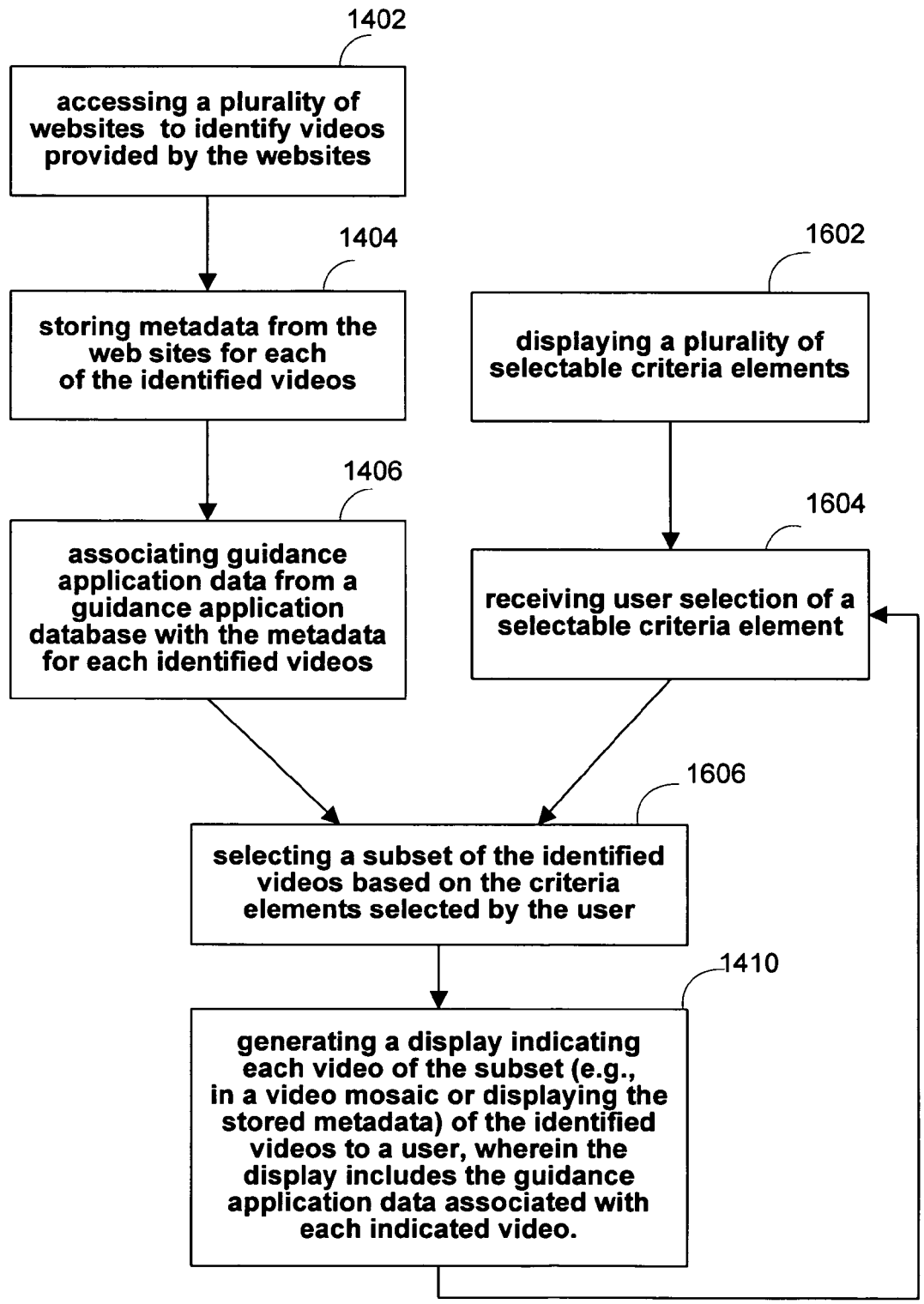
FIG. 16 shows an illustrative flow diagram for obtaining, selecting, and displaying listings based on user-selected criteria elements.

In accordance with a principle of the present invention, a set of videos may be identified, and further refined, based on user selection of selectable criteria elements. Flow diagram 1600 of FIG. 16 illustrates such a process. Online media information may be obtained and processed based on the strategies discussed in steps 1404 to 1406. Criteria elements (e.g., action/adventure, news, ABC, Comedy Central, etc.) may be displayed to a user, such as in window 214 of FIG. 2, at step 1602. In some embodiments, the selectable criteria elements may be a predefined set of criteria elements that are always displayed. In other embodiments, the selectable criteria elements may include only criteria elements that meet the media identified from the Internet at step 1402.

At step 1604, the media guidance application receives user indication of one of the selectable criteria elements. Based on the selected criteria element, a subset of the identified media is selected at step 1606. Since the selected criteria element is the first criterion chosen by the user, the subset is chosen based on only this selected criteria element. However, if other selected criteria elements had already been received, the subset of videos may be chosen based on one or more of all the selected criteria elements. The subset of identified videos may be chosen based on any of the strategies discussed above in connection with step 1408 of FIG. 14.

After a subset of videos is chosen, a display may be generated indicating each video in the subset at step 1410, such as in mosaic 208 of FIG. 2. This step may proceed by using any of the techniques discussed in connection with FIG. 14. The media guidance application may then receive a user selection of another selectable criteria element at 1604. This would refine the chosen subset of videos at step 1606, and the altered subset would be reflected in the display generated at step 1410.

Figure 17:
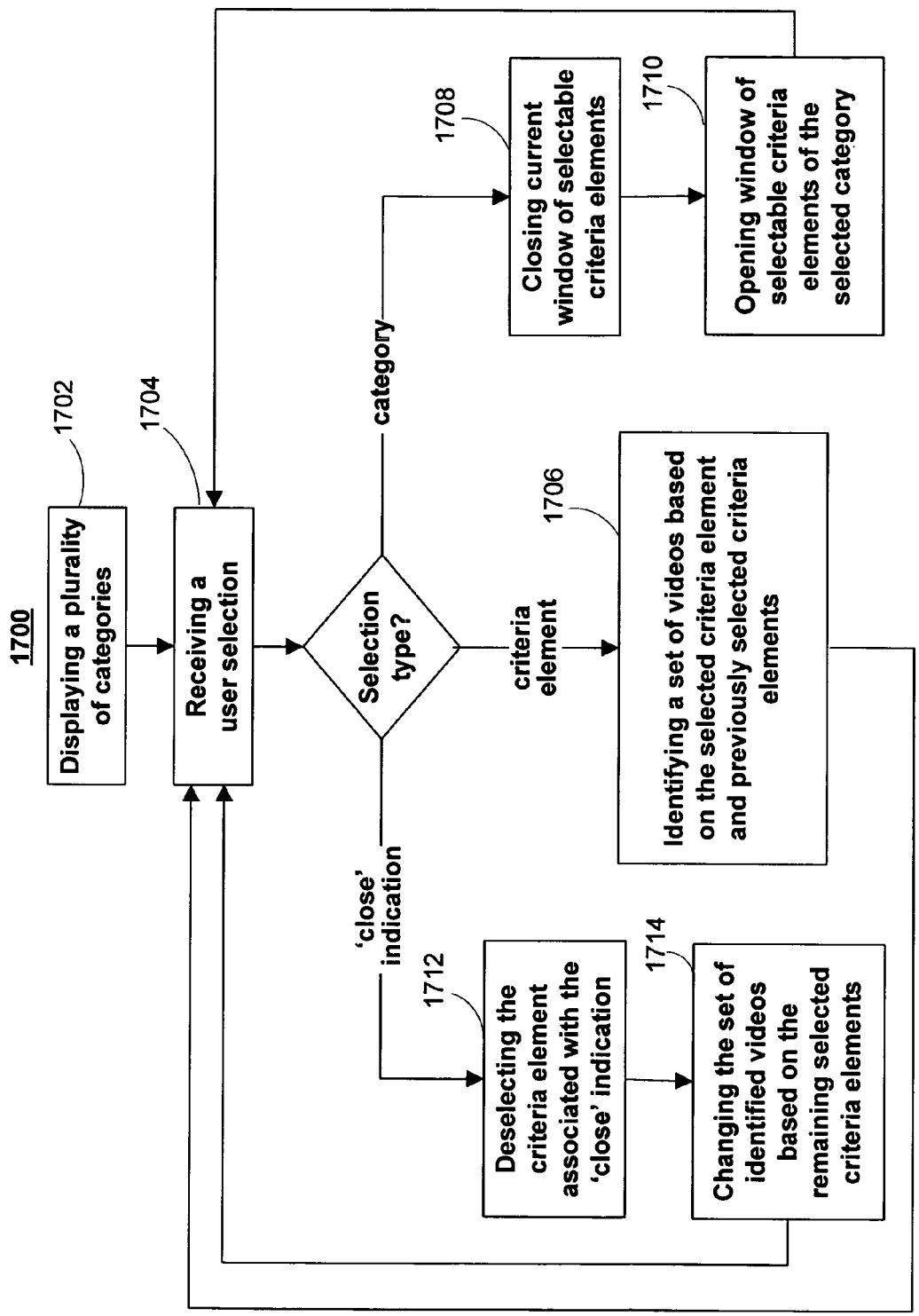
FIG. 17 shows an illustrative flow diagram for displaying criteria elements and identifying online media.

In some embodiments, a guidance application may display selectable criteria elements grouped into categories. Based on user selection, videos of interest to the user may be identified and the displayed criteria elements may be updated accordingly. The identified videos may therefore depend not only on which criteria elements are selected, but also on what categories have selected criteria elements. Flow chart 1700 of FIG. 17 is an illustrative flow chart in accordance with a principle of the present invention. As discussed in greater detail below, flow chart 1700 may take on many embodiments.

In one embodiment of flow chart 1700, a set of identified videos depends only on the most recently selected criteria element. When the user first enters the guidance application, a plurality of categories is displayed to the user at step 1702. For example, the categories may be genre, channels, shows, and hotlists (see column 202 of FIG. 2). In addition, one of the categories may default to a selected stage, where a window of criteria elements within the category is displayed. In some embodiments, a criteria element for a selected category is displayed only if at least one video in the database meets the criteria element.

Upon receiving a user selection at step 1704, if the selection is a criteria element within a selected category (e.g. criteria element 212 in FIG. 2), videos that meet the selected criterion are identified at step 1706. The videos may be identified based on any of the strategies discussed in connection with FIG. 14. The identified videos may be displayed in a mosaic, such as in display screen 200 of FIG. 2. The media guidance application may then receive a user selection of another criterion in the current category or receive a selection of a different category (step 1704).

Upon receiving a user selection at step 1704, if the selection is a category other than the currently selected category, the window of selectable criteria elements corresponding to the currently selected category is closed at step 1708. A new window is presented at step 1710, and selectable criteria elements corresponding to the newly selected category are displayed within the new window. The window may be situated directly below the category to indicate that the window corresponds to that category. The user interface may then receive a user selection of a criteria element in the newly selected category or receive a selection of a different category (step 1704).

In another embodiment of flow chart 1700, the media guidance application may keep track of selected criteria elements, and use each selected criteria element to narrow the scope of the identified videos. When the user first enters the guidance application, a plurality of categories is displayed to the user at step 1702. For example, the categories may be genre, channels, shows, and hotlists (see column 202 of FIG. 2). In addition, one of the categories may default to a selected stage, where a window of criteria elements within the category is displayed.

Upon receiving a user selection at step 1704, if the selection is a criteria element within the selected category, videos that meet the selected criterion and all previously selected criteria are identified (step 1706). Since selecting the criteria element adds a condition that all identified videos must meet, selecting the criteria element narrows the video set and decreases the number of identified videos. For an example, see the discussion of columns 800B and 800C of FIGS. 8B and 8C, where a set of identified videos is reduced from 139 (822 in FIG. 8B) to 30 (824 in FIG. 8C). When multiple criteria elements are selected from one or more categories, the identified videos meet the Boolean expression:

(SC1 AND SC2 AND . . . AND newly selected criterion), where "SCX" stands for "selected criterion X." Alternatively, other suitable multiple selection criteria schemes may be utilized, such as an inclusive selection of all identified videos falling within any one of a plurality of selection criteria; the identified videos may meet the Boolean expression: (SC1 OR SC2 OR . . . OR newly selected criterion), where "SCX" stands for "selected criterion X."

Upon receiving a user selection at step 1704, if the selection is an indication to "close" a previously selected criteria element (e.g., by selecting button 220 of display screen 200), the criterion corresponding to the close indication is deselected (step 1712). Thus, the set of identified videos expands to include all videos that meet the remaining selected criteria elements, but not the deselected criteria element at step 1714.

Upon receiving a user selection at step 1704, if the selection is a category other than the currently selected category, the window corresponding to the currently selected category may be closed at step 1708 (e.g., window 814 of FIG. 8B). A new window is presented (e.g., window 826 of FIG. 8C), and selectable criteria elements corresponding to the newly selected category are displayed within the new window (step 1710). The selectable criteria elements may include criteria elements that, if selected, would result in at least one identified video. That is, a selectable criteria element in the newly selected category may be displayed if there are available videos that meet the criteria element and all previously selected criteria elements.

Similarly, upon user selection of a criteria element at 1704, the remaining selectable criteria elements in the category may also be reduced in conjunction with narrowing the identified videos at step 1706. That is, after narrowing the set of identified videos, a selectable criteria element may be removed from the list if there are no videos in the narrowed set that also meet the selectable criteria element.

In another embodiment of flow chart 1700, selecting multiple criteria elements may expand the set of identified videos. When the user first enters the guidance application, the media guidance application may display a plurality of categories at step 1702. For example, the categories may be genre, channels, shows, and hotlists. In addition, one of the categories may default to a selected stage, where a window of criteria elements within the category is displayed.

Upon receiving a user selection at step 1704, if the selection is a criteria element within the selected category, a set of videos is identified, where each video meets (1) the selected criteria element or any of the previously selected criteria elements of the same category, and (2) at least one selected criteria element in each of the other categories that have at least one selected criteria element (step 1706). The video set may be expanded to include videos that meet only the newly selected criteria element and none of the previously selected criteria elements in the category. For an example, see the discussion of columns 900A and 900B of FIGS. 9A and 9C, where a set of identified videos is expanded from 139 (902 in FIG. 9A) to 627 (904 in FIG. 9B). Thus, when multiple criteria elements are selected from one or more categories, the identified videos meet the Boolean expression:

(SC1$_{cat1}$ OR . . . OR SCN$_{cat1}$) AND (SC1$_{cat2}$ OR . . . OR SCN$_{cat2}$) . . . , where "SCX$_{catY}$" represents "selected criterion X in category Y."

Upon receiving a user selection at step 1704, if the selection is an indication to "close" a previously selected criteria element (e.g., by selecting button 220 of display screen 200), the criterion corresponding to the close indication is deselected (step 1712). Since a subset of the identified videos may have only met the deselected criterion in the category and none of the remaining selected criteria elements, the videos in that subset are no longer identified and presented to the user (step 1714). Therefore, deselecting a criteria element may narrow the video set and reduce the number of identified videos.

Upon receiving a user selection at step 1704, if the selection is a category other than the currently selected category, the window corresponding to the currently selected category is closed at 1708. A new window is presented below the newly selected category, such as window 906 of FIG. 9B, and selectable criteria elements corresponding to the newly selected category (e.g., 908 or 910 of FIG. 9B) may be displayed within the new window (step 1710). The list of selectable criteria elements may include criteria elements that, if selected, would return at least one video. That is, a selectable criteria element in the newly selected category may be displayed if there are videos in the database that meet (1) the selectable criteria element or any other previously selected criteria element in the same category, and (2) at least one selected criteria element in each of the remaining categories with at least one selected element.

In another embodiment of flow chart 1700, the effect of selecting a criteria element may depend on which category the criteria element is in. For example, selecting multiple criteria elements in some categories (e.g., genre) may cause the guidance application at step 1706 to identify videos that meet all of the selected criteria elements. Selecting multiple criteria elements in another category (e.g., channels and shows) may cause the guidance application to identify videos that meet any of the selected criteria elements. Essentially, this embodiment is a combination of the two embodiments previously discussed. Thus, when multiple criteria elements are selected from one or more categories, the identified videos may meet the Boolean expression:

$(SC1_{cat1} \text{ OR} \ldots \text{OR } SCN_{cat1}) \text{ AND } (SC1_{cat2} \text{ AND} \ldots \text{AND } SCN_{cat2}) \ldots$, where "$SCX_{catY}$" represents "selected criterion X in category Y."

Figure 18:
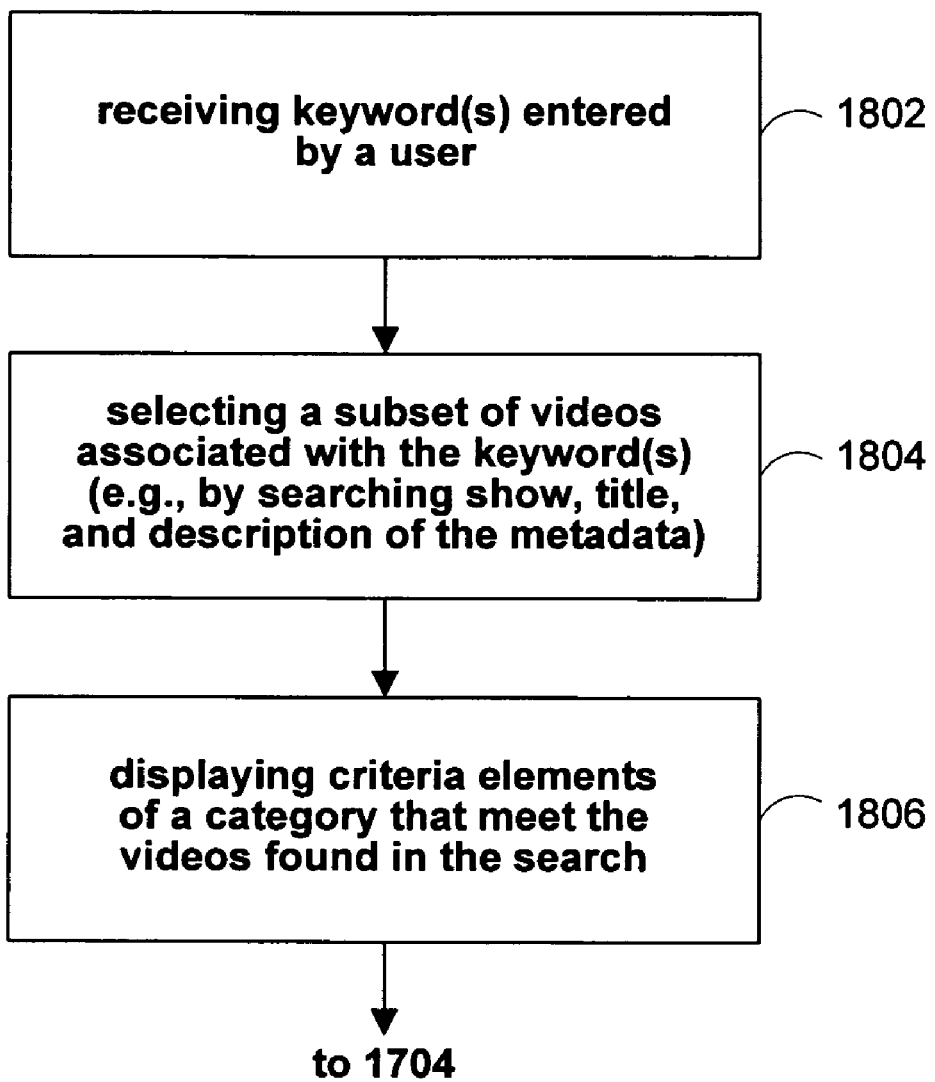
FIG. 18 shows an illustrative flow diagram for choosing criteria elements based on user-entered search terms.

A media guidance application may also use keywords entered by a user to define a set of videos. FIG. 18 shows illustrative flow diagram 1800 for providing videos and criteria elements following reception of one or more keywords. At step 1802, one or more keywords is received by the media guidance application. A set of videos is identified at step 1804 based on the one or more keywords. The set may be selected based on any of the strategies described above in connection with FIG. 14. A set of criteria elements of a category (e.g., the selected category from step 1710 of FIG. 17) may be displayed at step 1806. The displayed criteria elements may include only those that meet the set of videos identified at step 1804. The user may then continue changing the set of videos based on the strategies described in connection with flow diagram 1700.

The foregoing describes systems and methods for acquiring, categorizing, and delivering online media content using an interactive media guidance application. The above described embodiments of the present invention are presented for purposes of illustration and not of limitation.

What is claimed is:

1. A method for providing guidance for videos on the Internet, comprising:
   accessing a plurality of Internet sites to identify videos provided by the Internet sites;
   storing metadata from the Internet sites for each of the identified videos;
   associating guidance application data from a guidance application database with the metadata for each of the identified videos;
   generating a media display indicating to a user each video of a subset of the identified videos, wherein the media display includes the guidance application data associated with each indicated video;
   in response to the user selecting a first category from a plurality of scope narrowing criteria categories, displaying a first window in which a first plurality of selectable criteria elements of the first category are displayed simultaneously with the media display, wherein:
      the plurality of scope narrowing criteria categories are arranged according to a first pre-selected user preference, wherein the first pre-selected user preference is customized by the user in advance of the displaying of the first window;
   in response to the user selecting a second category from the plurality of scope narrowing criteria categories, displaying a second window in which a second plurality of selectable criteria elements of the second category are displayed simultaneously with the media display, wherein:
      the displayed second plurality of selectable criteria elements are limited in response to a selected criteria element of the first plurality of selectable criteria elements; and
      the subset of the videos indicated in the media display are selected according to the criteria element of the first plurality of selectable criteria elements that is selected by the user and a criteria element of the second plurality of selectable criteria elements that is selected by the user; and
   in response to the user selecting said criteria element of the second plurality of selectable criteria elements, displaying a third window in which one or more recommended videos from the plurality of accessed Internet sites is displayed simultaneously with the media display, wherein:
      the one or more recommended videos is selected according to a second pre-selected user preference.

2. The method defined in claim 1 wherein the Internet sites comprise web sites.

3. The method defined in claim 1 further comprising closing the first window of selectable criteria elements in response to the user selecting the second of a plurality of scope narrowing criteria categories.

4. The method defined in claim 1 wherein:
   the method further comprises receiving a user's selection of the selectable criteria element of the first criteria category; and
   limiting the criteria elements of the second window to criteria elements met by videos that also meet the criteria element of the first category selected by the user.

5. The method defined in claim 1 wherein the indicated videos are arranged in a video mosaic.

6. The method defined in claim 5 wherein the indicated videos of the mosaic change as the user selects criteria elements.

7. The method defined in claim 5 wherein:
   the media display indicates each video using a frame from each video; and
   the method further comprises redirecting the user to the Internet site that provides the video of the selected frame in response to the user selecting a frame.

8. The method defined in claim 1 further comprising displaying the number of videos meeting the criteria elements selected by the user.

9. The method defined in claim 1 wherein the criteria categories comprise genre, channel and video title.

10. The method defined in claim 1 wherein the guidance application data of the display comprises program descriptions, editorial comments, media content related to the videos, or links to Internet sites providing media content related to the indicated videos.

11. The method defined in claim 1 wherein the display is provided by an interactive program guide.

12. A system for providing guidance for videos on the Internet, comprising:
communication circuitry;
storage; and
processing circuitry configured to:
access a plurality of Internet sites using the communication circuitry to identify videos provided by the Internet sites;
store metadata from the Internet sites in the storage for each of the identified videos;
associate guidance application data from a guidance application database with the metadata for each of the identified videos;
generate a media display indicating each video of a subset of the identified videos, wherein the media display includes the guidance application data associated with each indicated video;
in response to the user selecting a first category from a plurality of scope narrowing criteria categories, display a first window in which a first plurality of selectable criteria elements of the first category are displayed simultaneously with the media display, wherein:
the plurality of scope narrowing criteria categories are arranged according to a first pre-selected user preference, wherein the first pre-selected user preference is customized by the user in advance of the displaying of the first window;
in response to the user selecting a second category from the plurality of scope narrowing criteria categories, display a second window in which a second plurality of selectable criteria elements of the second category are displayed simultaneously with the media display, wherein:
the displayed second plurality of selectable criteria elements are limited in response to a selected criteria element of the first plurality of selectable criteria elements; and
the subset of the videos indicated in the media display are selected according to the criteria element of the first plurality of selectable criteria elements that is selected by the user and a criteria element of the second plurality of selectable criteria elements that is selected by the user; and
in response to the user selecting said criteria element of the second plurality of selectable criteria elements, display a third window in which one or more recommended videos from the plurality of accessed Internet sites is displayed simultaneously with the media display, wherein:
the one or more recommended videos is selected according to a second pre-selected user preference.

13. The system defined in claim 12 wherein the Internet sites comprise web sites.

14. The system defined in claim 12 further comprising closing the first window of selectable criteria elements in response to the user selecting the second of a plurality of scope narrowing criteria categories.

15. The system defined in claim 12 wherein the processing circuitry is further configured to:
receive a user's selection of the selectable criteria element of the first criteria category; and
limit the criteria elements of the second window to criteria elements met by videos that also meet the criteria element of the first category selected by the user.

16. The system defined in claim 12 wherein the indicated videos are arranged in a video mosaic.

17. The system defined in claim 16 wherein the indicated videos of the mosaic change as the user selects criteria elements.

18. The system defined in claim 16 wherein:
the display indicates each video using a frame from each video; and
the processing circuitry is further configured to redirect the user to the Internet site that provides the video of a frame in response to the user selecting the frame.

19. The system defined in claim 12 wherein the processing circuitry is further configured to display the number of videos meeting the criteria elements selected by the user.

20. The system defined in claim 12 wherein the criteria categories comprise genre, channel and video title.

21. The system defined in claim 12 wherein the guidance application data of the display comprises program descriptions, editorial comments, media content related to the videos, or links to Internet sites providing media content related to the indicated videos.

22. The system defined in claim 12 wherein the processing circuitry is configured by instructions of an interactive program guide.

23. The method defined in claim 1 further comprising:
allowing the user to select at least two different criteria elements of the first plurality of selectable criteria elements;
wherein the subset of the videos indicated in the media display are selected according to the at least two different criteria elements selected by the user.

24. The method defined in claim 1 further comprising:
displaying the plurality of scope narrowing criteria categories in a list; and
allowing the user to select the first and second categories from the list.

25. The method of claim 1, wherein the plurality of scope narrowing criteria categories are arranged in an order according to a profile of the user.

26. The method of claim 1, wherein:
the first and second windows are hidden from display; and
the first and second windows are revealed as a result of the user selection of the respective first and second categories.

27. The system defined in claim 12 wherein the processing circuitry is further configured to:
allow the user to select at least two different criteria elements of the first plurality of selectable criteria elements;
wherein the subset of the videos indicated in the media display are selected according to the at least two different criteria elements selected by the user.

28. The system defined in claim 12 wherein the processing circuitry is further configured to:
display the plurality of scope narrowing criteria categories in a list; and
allow the user to select the first and second categories from the list.

29. The system of claim 12, wherein the plurality of scope narrowing criteria categories are arranged in an order according to a profile of the user.

30. The system of claim 12, wherein:
the first and second windows are hidden from display; and the first and second windows are revealed as a result of the user selection of the respective first and second categories.

31. A method for providing guidance for videos on the Internet, comprising:
accessing a plurality of Internet sites to identify videos provided by the Internet sites;
storing metadata from the Internet sites for each of the identified videos;
associating guidance application data from a guidance application database with the metadata for each of the identified videos;
generating a media display indicating to a user each video of a subset of the identified videos, wherein the media display includes the guidance application data associated with each indicated video;
in response to the user selecting a first category from a plurality of scope narrowing criteria categories, displaying a first window in which a first plurality of selectable criteria elements of the first category are displayed simultaneously with the media display, wherein:
the plurality of scope narrowing criteria categories are arranged according to a pre-selected user preference, wherein the pre-selected user preference is customized by the user in advance of the displaying of the first window;
in response to the user selecting a second category from the plurality of scope narrowing criteria categories, displaying a second window in which a second plurality of selectable criteria elements of the second category are displayed simultaneously with the media display, wherein:
the displayed second plurality of selectable criteria elements are limited in response to a selected criteria element of the first plurality of selectable criteria elements; and
the subset of the videos indicated in the media display are selected according to the criteria element of the first plurality of selectable criteria elements that is selected by the user and a criteria element of the second plurality of selectable criteria elements that is selected by the user; and
in response to the user selecting said criteria element of the second plurality of selectable criteria elements, displaying a third window in which one or more recommended videos from the plurality of accessed Internet sites is displayed simultaneously with the media display, wherein:
the one or more recommended videos is selected according to said criteria element of the first plurality of selectable criteria elements and said criteria element of the second plurality of selectable criteria elements.

32. A method for providing guidance for videos on the Internet, comprising:
accessing a plurality of Internet sites to identify videos provided by the Internet sites;
storing metadata from the Internet sites for each of the identified videos;
associating guidance application data from a guidance application database with the metadata for each of the identified videos;
generating a media display indicating to a user each video of a subset of the identified videos, wherein the media display includes the guidance application data associated with each indicated video;
in response to the user selecting a first category from a plurality of scope narrowing criteria categories, displaying a first window in which a first plurality of selectable criteria elements of the first category are displayed simultaneously with the media display, wherein:
the plurality of scope narrowing criteria categories are arranged according to a first pre-selected user preference, wherein the first pre-selected user preference is customized by the user in advance of the displaying of the first window; and
in response to the user selecting a second category from the plurality of scope narrowing criteria categories, displaying a second window in which a second plurality of selectable criteria elements of the second category are displayed simultaneously with the media display, wherein:
the displayed second plurality of selectable criteria elements are limited in response to a selected criteria element of the first plurality of selectable criteria elements; and
the subset of the videos indicated in the media display are selected according to the criteria element of the first plurality of selectable criteria elements that is selected by the user and a criteria element of the second plurality of selectable criteria elements that is selected by the user, wherein:
the selected subset of videos indicated in the media display is further limited by a second pre-selected user preference.

33. A method for providing guidance for videos on the Internet, comprising:
accessing a plurality of Internet sites to identify videos provided by the Internet sites;
storing metadata from the Internet sites for each of the identified videos;
associating guidance application data from a guidance application database with the metadata for each of the identified videos;
generating a media display indicating to a user each video of a subset of the identified videos, wherein the media display includes the guidance application data associated with each indicated video;
in response to the user selecting a first category from a plurality of scope narrowing criteria categories, displaying a first window in which a first plurality of selectable criteria elements of the first category are displayed simultaneously with the media display, wherein:
the plurality of scope narrowing criteria categories are arranged according to a pre-selected user preference, wherein the pre-selected user preference is customized by the user in advance of the displaying of the first window; and
in response to the user selecting a second category from the plurality of scope narrowing criteria categories, displaying a second window in which a second plurality of selectable criteria elements of the second category are displayed simultaneously with the media display, wherein:
the displayed second plurality of selectable criteria elements are limited in response to a selected criteria element of the first plurality of selectable criteria elements; and
the subset of the videos indicated in the media display are selected according to the criteria element of the first plurality of selectable criteria elements that is selected by the user and a criteria element of the second plurality of selectable criteria elements that is selected by the user, wherein:

the selected subset of videos indicated in the media display is further limited by a specified range of video lengths or a specified date range.

34. A system for providing guidance for videos on the Internet, comprising:
communication circuitry;
storage; and
processing circuitry configured to:
  access a plurality of Internet sites using the communication circuitry to identify videos provided by the Internet sites;
  store metadata from the Internet sites in the storage for each of the identified videos;
  associate guidance application data from a guidance application database with the metadata for each of the identified videos;
  generate a media display indicating each video of a subset of the identified videos, wherein the media display includes the guidance application data associated with each indicated video;
  in response to the user selecting a first category from a plurality of scope narrowing criteria categories, display a first window in which a first plurality of selectable criteria elements of the first category are displayed simultaneously with the media display, wherein:
    the plurality of scope narrowing criteria categories are arranged according to a pre-selected user preference, wherein the pre-selected user preference is customized by the user in advance of the displaying of the first window;
  in response to the user selecting a second category from the plurality of scope narrowing criteria categories, display a second window in which a second plurality of selectable criteria elements of the second category are displayed simultaneously with the media display, wherein:
    the displayed second plurality of selectable criteria elements are limited in response to a selected criteria element of the first plurality of selectable criteria elements; and
    the subset of the videos indicated in the media display are selected according to the criteria element of the first plurality of selectable criteria elements that is selected by the user and a criteria element of the second plurality of selectable criteria elements that is selected by the user; and
  in response to the user selecting said criteria element of the second plurality of selectable criteria elements, display a third window in which one or more recommended videos from the plurality of accessed Internet sites is displayed simultaneously with the media display, wherein:
    the one or more recommended videos is selected according to said criteria element of the first plurality of selectable criteria elements and said criteria element of the second plurality of selectable criteria elements.

35. A system for providing guidance for videos on the Internet, comprising:
communication circuitry;
storage; and
processing circuitry configured to:
  access a plurality of Internet sites using the communication circuitry to identify videos provided by the Internet sites;
  store metadata from the Internet sites in the storage for each of the identified videos;
  associate guidance application data from a guidance application database with the metadata for each of the identified videos;
  generate a media display indicating each video of a subset of the identified videos, wherein the media display includes the guidance application data associated with each indicated video;
  in response to the user selecting a first category from a plurality of scope narrowing criteria categories, display a first window in which a first plurality of selectable criteria elements of the first category are displayed simultaneously with the media display, wherein:
    the plurality of scope narrowing criteria categories are arranged according to a first pre-selected user preference, wherein the first pre-selected user preference is customized by the user in advance of the displaying of the first window; and
  in response to the user selecting a second category from the plurality of scope narrowing criteria categories, display a second window in which a second plurality of selectable criteria elements of the second category are displayed simultaneously with the media display, wherein:
    the displayed second plurality of selectable criteria elements are limited in response to a selected criteria element of the first plurality of selectable criteria elements; and
    the subset of the videos indicated in the media display are selected according to the criteria element of the first plurality of selectable criteria elements that is selected by the user and a criteria element of the second plurality of selectable criteria elements that is selected by the user, wherein:
      the selected subset of videos indicated in the media display is further limited by a second pre-selected user preference.

36. A system for providing guidance for videos on the Internet, comprising:
communication circuitry;
storage; and
processing circuitry configured to:
  access a plurality of Internet sites using the communication circuitry to identify videos provided by the Internet sites;
  store metadata from the Internet sites in the storage for each of the identified videos;
  associate guidance application data from a guidance application database with the metadata for each of the identified videos;
  generate a media display indicating each video of a subset of the identified videos, wherein the media display includes the guidance application data associated with each indicated video;
  in response to the user selecting a first category from a plurality of scope narrowing criteria categories, display a first window in which a first plurality of selectable criteria elements of the first category are displayed simultaneously with the media display, wherein:
    the plurality of scope narrowing criteria categories are arranged according to a pre-selected user preference, wherein the pre-selected user preference is customized by the user in advance of the displaying of the first window; and
  in response to the user selecting a second category from the plurality of scope narrowing criteria categories, display a second window in which a second plurality of selectable criteria elements of the second category are displayed simultaneously with the media display, wherein:

the displayed second plurality of selectable criteria elements are limited in response to a selected criteria element of the first plurality of selectable criteria elements; and the subset of the videos indicated in the media display are selected according to the criteria element of the first plurality of selectable criteria elements that is selected by the user and a criteria element of the second plurality of selectable criteria elements that is selected by the user, wherein:

the selected subset of videos indicated in the media display is further limited by a specified range of video lengths or a specified date range.

* * * * *